(12) United States Patent
Kulkarni et al.

(10) Patent No.: US 11,588,766 B2
(45) Date of Patent: *Feb. 21, 2023

(54) MOBILE DASHBOARD FOR AUTOMATED CONTACT CENTER TESTING

(71) Applicant: Cyara Solutions Pty Ltd, Hawthorn (AU)

(72) Inventors: Alok Kulkarni, Glen Iris (AU); Geoff Willshire, Greenslopes (AU); Gavin Sansom, Lisarow (AU)

(73) Assignee: CYARA SOLUTIONS PTY LTD, Hawthorn Vic (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,064

(22) Filed: Oct. 29, 2021

(65) Prior Publication Data

US 2022/0124057 A1 Apr. 21, 2022

Related U.S. Application Data

(63) Continuation of application No. 16/718,969, filed on Dec. 18, 2019, now Pat. No. 11,178,080, which is a continuation-in-part of application No. 15/789,838, filed on Oct. 20, 2017, now Pat. No. 10,523,604, which is a continuation-in-part of application No. 15/789,667, filed on Oct. 20, 2017, now Pat. No.

(Continued)

(51) Int. Cl.
| | |
|---|---|
| *H04M 3/51* | (2006.01) |
| *H04M 3/28* | (2006.01) |
| *H04M 7/00* | (2006.01) |
| *H04L 51/046* | (2022.01) |
| *H04L 51/02* | (2022.01) |
| *H04L 43/50* | (2022.01) |
| *H04L 43/55* | (2022.01) |
| *H04L 51/214* | (2022.01) |
| *H04L 41/50* | (2022.01) |
| *H04L 41/00* | (2022.01) |
| *H04L 41/14* | (2022.01) |

(52) U.S. Cl.
CPC ............ *H04L 51/046* (2013.01); *H04L 43/50* (2013.01); *H04L 43/55* (2022.05); *H04L 51/02* (2013.01); *H04L 51/214* (2022.05); *H04M 3/28* (2013.01); *H04M 3/5175* (2013.01); *H04M 3/5191* (2013.01); *H04M 7/0045* (2013.01); *H04L 41/00* (2013.01); *H04L 41/14* (2013.01); *H04L 41/5093* (2013.01)

(58) Field of Classification Search
CPC combination set(s) only.
See application file for complete search history.

(56) References Cited

U.S. PATENT DOCUMENTS

2008/0294690 A1* 11/2008 McClellan ............ G07C 5/0808
2014/0181676 A1* 6/2014 Samborskyy ............ H04L 41/22
715/736

\* cited by examiner

*Primary Examiner* — Amal S Zenati
(74) *Attorney, Agent, or Firm* — Galvin Patent Law LLC; Brian R. Galvin

(57) ABSTRACT

A mobile dashboard for automated contact center testing gives up-to-the-minute status reports on your customer experience, enabling you to make operational decisions and drill down to the source of an issue while on the go. A mobile-optimized executive dashboard display can be customized for each unique user, so business and technical stakeholders can filter the display for the customer experience (CX) metrics that are most relevant to them, and configure push notification alerts accordingly.

8 Claims, 29 Drawing Sheets

Related U.S. Application Data 10,469,418, which is a continuation-in-part of application No. 15/613,168, filed on Jun. 3, 2017, now Pat. No. 10,367,764, and a continuation-in-part of application No. 15/491,965, filed on Apr. 19, 2017, now Pat. No. 10,268,571, which is a continuation-in-part of application No. 15/157,384, filed on May 17, 2016, now Pat. No. 10,230,836, which is a continuation of application No. 14/709,252, filed on May 11, 2015, now Pat. No. 9,344,556, which is a continuation of application No. 14/140,470, filed on Dec. 25, 2013, now Pat. No. 9,031,221, which is a continuation of application No. 13/936,183, filed on Jul. 6, 2013, now abandoned, which is a continuation-in-part of application No. 13/567,089, filed on Aug. 6, 2012, now abandoned, and a continuation-in-part of application No. 12/644,343, filed on Dec. 22, 2009, now Pat. No. 8,625,772, said application No. 15/491,965 is a continuation-in-part of application No. 15/083,259, filed on Mar. 28, 2016, now Pat. No. 10,659,402, which is a continuation-in-part of application No. 14/854,023, filed on Sep. 14, 2015, now abandoned, which is a continuation of application No. 14/141,424, filed on Dec. 27, 2013, now Pat. No. 9,137,184, which is a continuation of application No. 14/140,449, filed on Dec. 24, 2013, now Pat. No. 9,137,183, which is a continuation of application No. 13/936,147, filed on Jul. 6, 2013, now abandoned, which is a continuation-in-part of application No. 13/567,089, filed on Aug. 6, 2012, now abandoned, which is a continuation-in-part of application No. 12/644,343, filed on Dec. 22, 2009, now Pat. No. 8,625,772, said application No. 14/141,424 is a continuation of application No. 13/936,186, filed on Jul. 6, 2013, now abandoned, which is a continuation-in-part of application No. 13/936,147, filed on Jul. 6, 2013, now abandoned.

(60) Provisional application No. 62/510,141, filed on May 23, 2017, provisional application No. 62/491,258, filed on Apr. 28, 2017, provisional application No. 62/491,252, filed on Apr. 28, 2017.

MOBILE DASHBOARD FOR AUTOMATED CONTACT CENTER TESTING

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/718,969
Ser. No. 15/789,838
Ser. No. 15/789,667
Ser. No. 15/613,168
62/491,252
Ser. No. 15/491,965
Ser. No. 15/157,384
Ser. No. 14/709,252
Ser. No. 14/140,470
Ser. No. 13/936,183
Ser. No. 13/567,089
Ser. No. 12/644,343
Ser. No. 15/083,259
Ser. No. 14/854,023
Ser. No. 14/141,424
Ser. No. 14/140,449
Ser. No. 13/936,147
Ser. No. 13/567,089
Ser. No. 12/644,343
Ser. No. 13/936,186
Ser. No. 13/936,147
62/491,258
62/510,141

BACKGROUND OF THE INVENTION

Field of the Art

The disclosure relates to the field of system testing, and more particularly to the field of providing a mobile dashboard for monitoring automated quality assurance testing of contact center infrastructure, particularly during production operations.

Discussion of the State of the Art

As contact center software solutions, whether a single monolithic service or a set multiple service offering from a number of vendors which together perform all needed tasks, have become more complex, so have systems and techniques to needed monitor and test them. The ability to qualify new software versions and variants on the entire range of hardware types expected to be deployed, to qualify new hardware or software combinations as they arise, or to monitor functional efficiency during events of unacceptable responsiveness under conditions mimicking the actual live usage, has become much more important. These types of test software, running on either dedicated equipment or on live equipment under instances of low live traffic are now available, but are currently inflexible in deployment, requiring significant preplanning and hardware resources, lack the ability to test function of important emerging system configurations such as those that include mobile devices as endpoints of interaction, have little modification capability while running, lack the ability to run unobtrusively, and thus cannot be used to diagnose problems encountered during actual call center use, have inflexible result reporting abilities and require a significant amount of programming knowledge to administer.

What is needed are computer service package testing suites that are easy and flexible to deploy, that accept modifications without the use of complex procedures while running, that have highly configurable and easily specified reporting formats, that can be deployed through a centralized gateway using simplified runtime commands instead of programming changes to the suites' source code themselves and that can be used to test a wide range of both software and hardware combinations in use, including mobile devices. It is further needed that executives and operational managers are able to monitor ongoing testing of contact center infrastructure and operations while mobile. Additionally, testing packages also need mechanisms to permit real time status of systems be available to mobile users that can provide a variety of levels of detail regarding the current status of a system in use with remote clients.

SUMMARY OF THE INVENTION

Accordingly, the inventor has conceived aid reduced to practice, a mobile dashboard for automated contact center testing. According to one aspect, a system for a mobile dashboard for automated contact center testing having a dashboard server, a notification hub, a messaging server, and one or more mobile dashboard devices is disclosed. The one or more mobile dashboard devices comprising at least a processor, a memory, and a plurality of programming instructions stored in the memory and operating on the processor, wherein the programmable instructions, when operating on the processor, cause the processor to receive real-time update data from the notification hub, generate history data from the real-time update data, receive mobile dashboard display commands, determine dashboard data needed for display to a user based upon the real-time update data, retrieve needed dashboard data from the dashboard server, and render a dashboard screen on the mobile dashboard device. The dashboard server, the notification hub, the messaging server, and the one or more mobile dashboard devices communicate over a wide area network.

According to another aspect, a method for operating a mobile dashboard for automated contact center testing, comprising the steps of receiving real-time update data from the notification hub, generating history data from the real-time update data, receiving mobile dashboard display commands, determining dashboard data needed for display to a user based upon the real-time update data, retrieving needed dashboard data from the dashboard server, and rendering a dashboard screen on the mobile dashboard device. The dashboard server, the notification hub, the messaging server, and the one or more mobile dashboard devices communicate over a wide area network, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in airy way.

Figure 2:
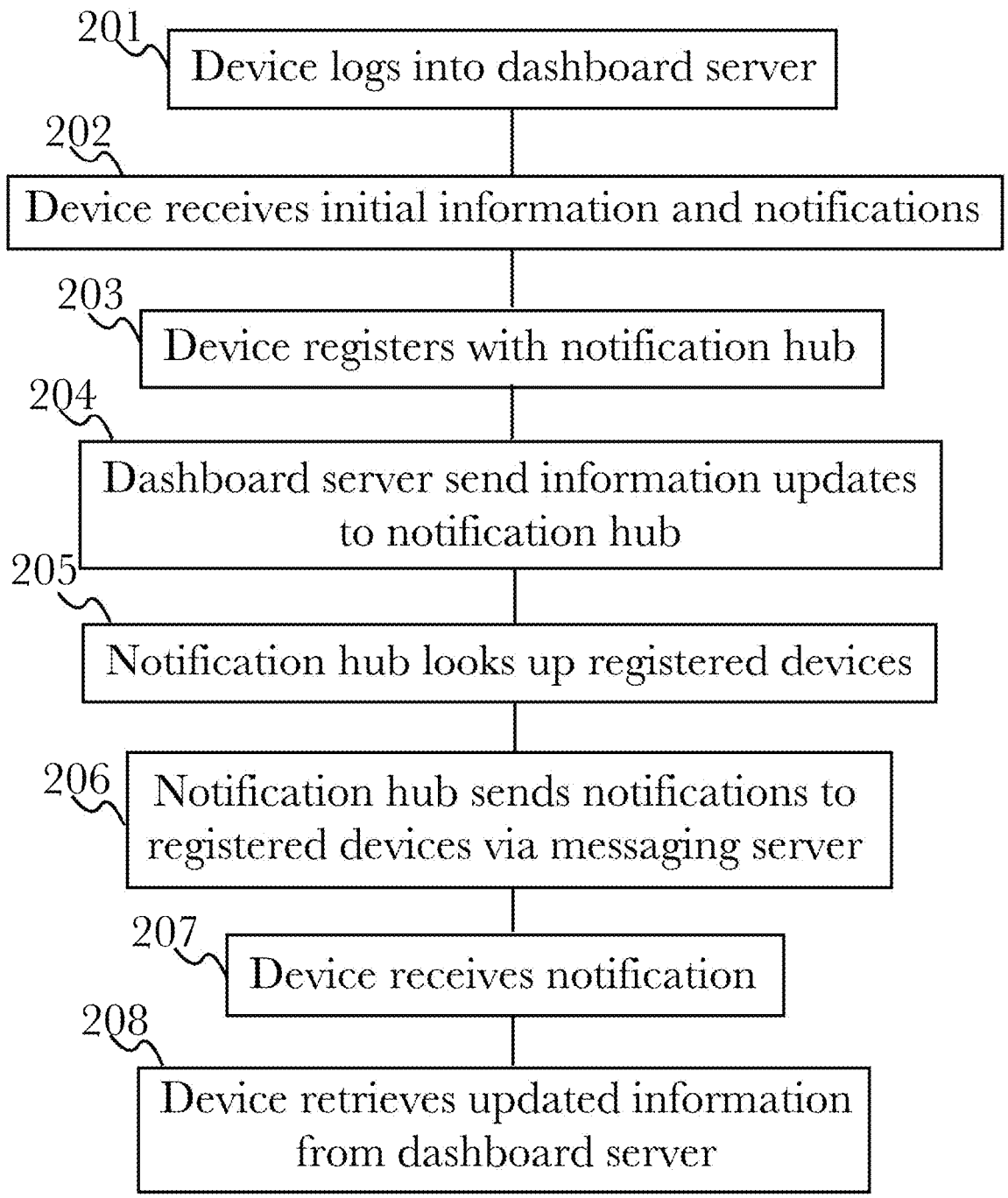
FIG. 2 is a flow diagram of an exemplary method for operating a mobile dashboard for automated contact center testing, according to an aspect.

FIG. 2.5 is a user display screen for mobile dashboard illustrating journey summary data for inbound customer service calls, according to one aspect.

Figure 26:
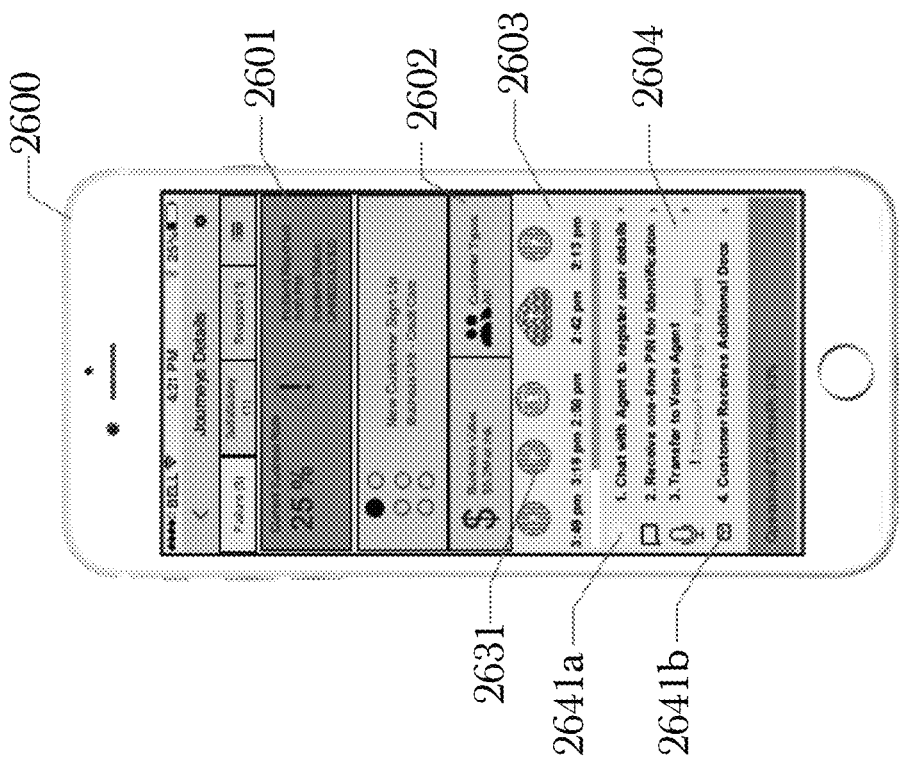

FIG. 26 is a user display screen for mobile dashboard illustrating details of journey data for one set of inbound customer service calls, according to one aspect.

Figure 27:
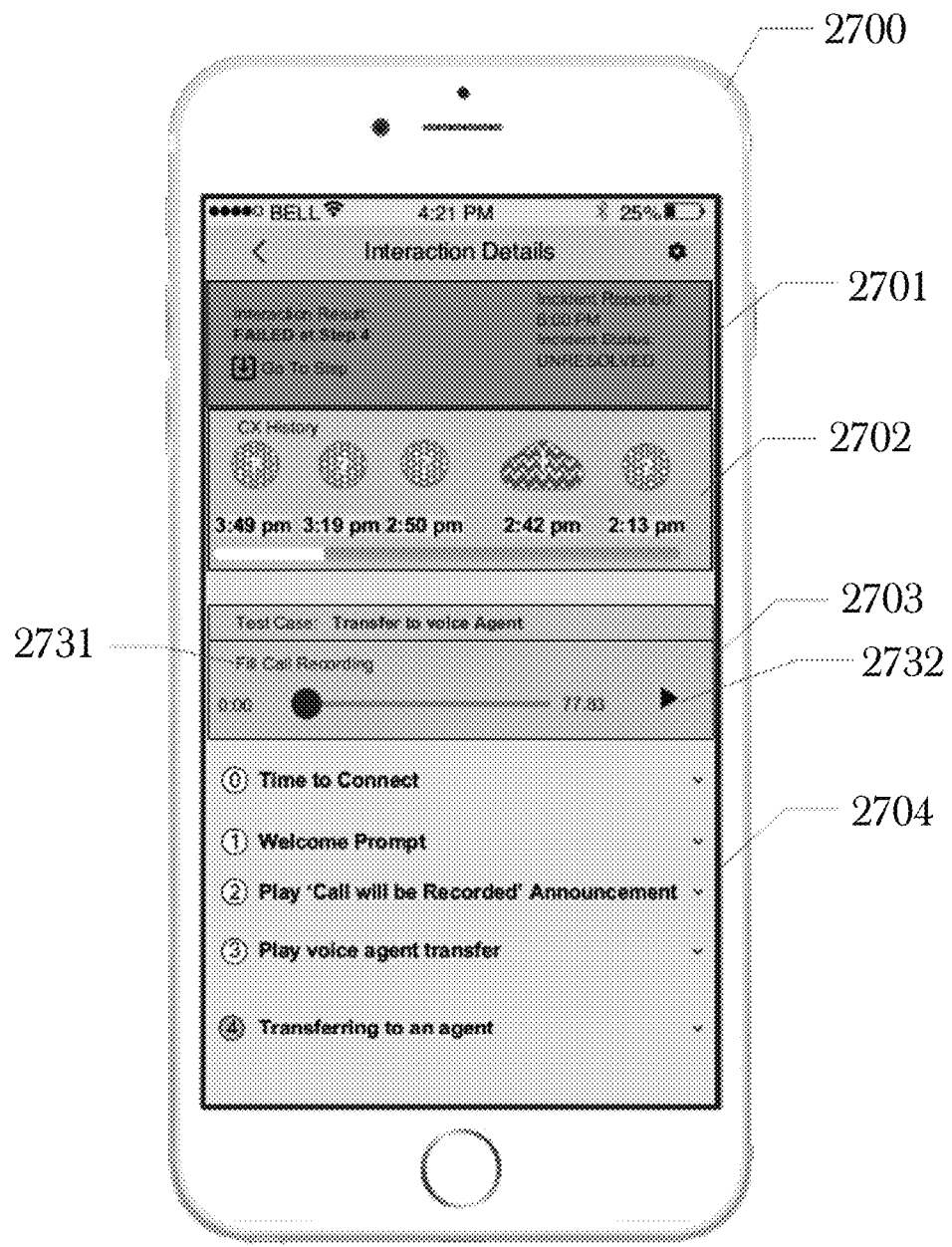

FIG. 27 is a user display screen for mobile dashboard illustrating interaction details of one particular inbound customer service call, according to one aspect.

Figure 28:
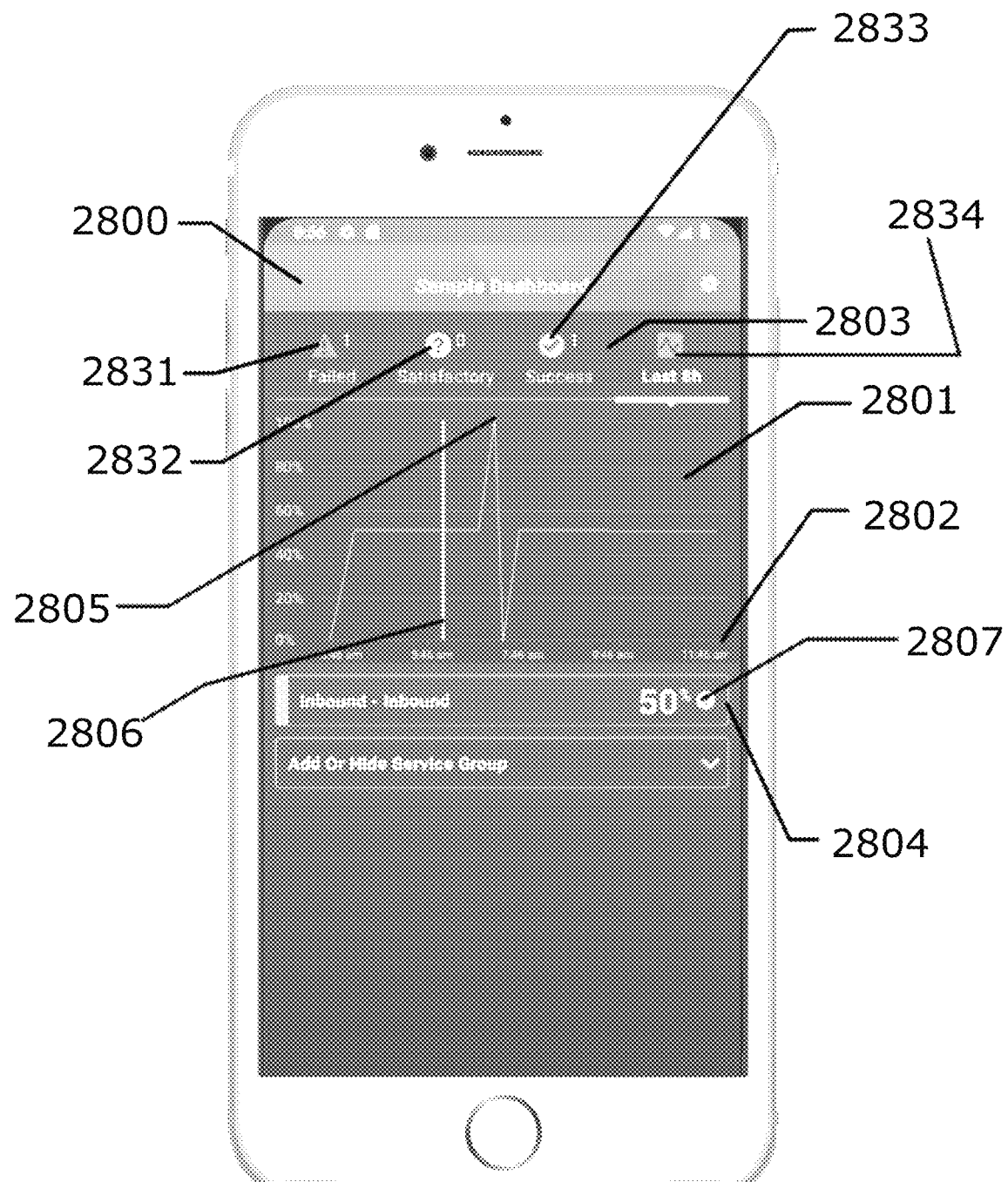

FIG. 28 is a user display screen for mobile dashboard illustrating results data for a set of possible results from inbound customer service calls, according to one aspect.

Figure 29:
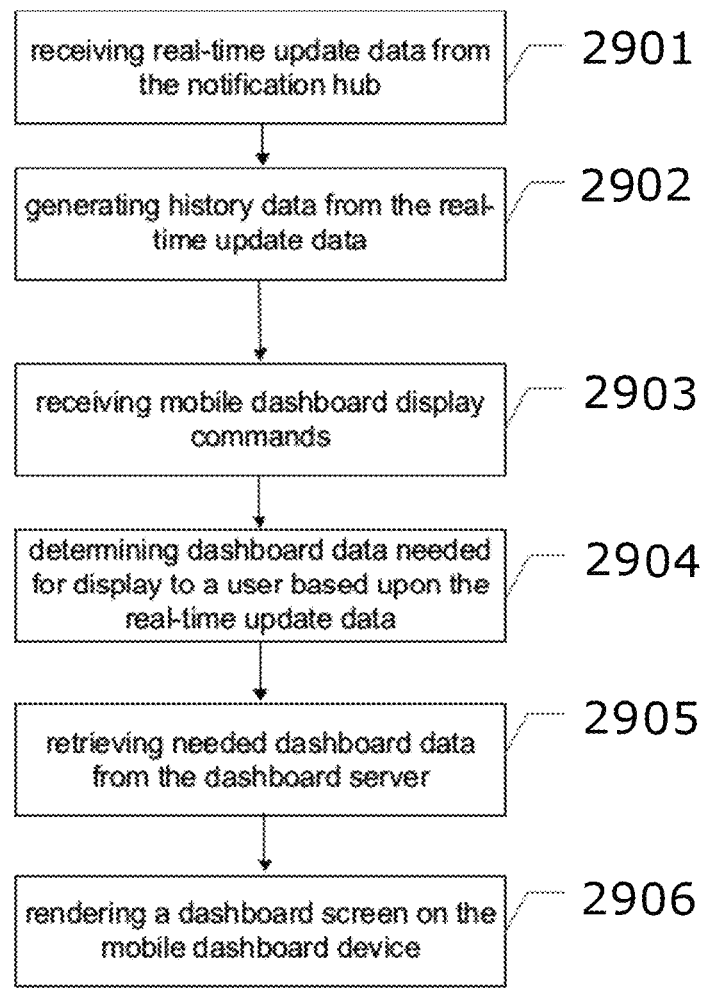

FIG. 29 is a flow diagram of an exemplary method for a mobile dashboard device operating a mobile dashboard for automated contact center testing, according to an aspect.

DETAILED DESCRIPTION

The inventor has conceived, and reduced to practice, a mobile dashboard for automated contact center testing.

One or more different aspects may be described in the present application. Further, for one of more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing born the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features we not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or mi ire communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 1:
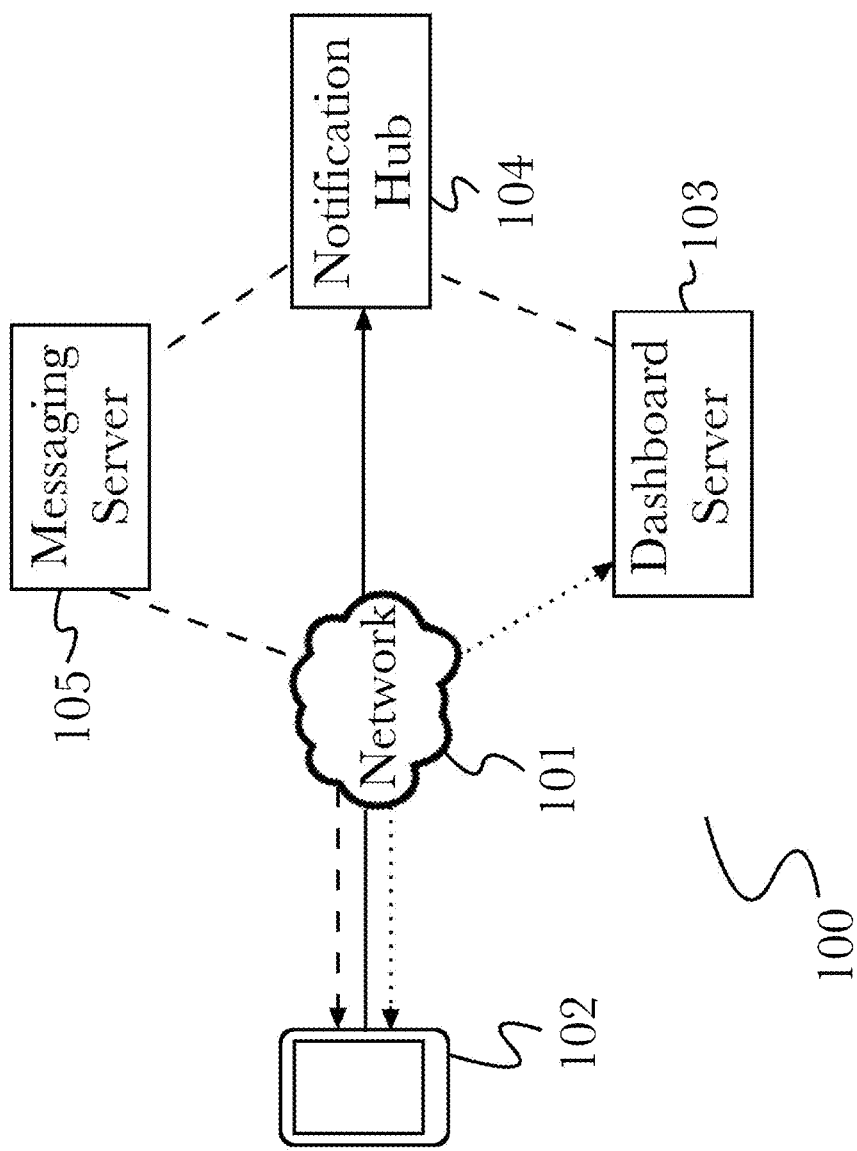
FIG. 1 is a block diagram of an exemplary system architecture for operating a mobile dashboard for automated contact center testing, according to an aspect.

FIG. 1 is a block diagram of an exemplary system architecture 100 for operating a mobile dashboard for automated contact center testing, according to an aspect. According to the aspect, a customer's mobile device 102 may connect via a network 101 to a dashboard server 103 and log in to an account, retrieving available information and notifications for the account and viewing a dashboard application linked to the account (as described below, referring to FIG. 10). Mobile device 102 may also connect to a notification hub 104 to register for notifications, which may be produced by notification hub 104 based on information received from dashboard server 103 and sent via a messaging server 105 for transmission to device 102 even when it is not currently connected to dashboard server 103 or viewing a dashboard application. Dashboard server 103 may provide a dashboard application for viewing via a network 101, for example as a web-accessible site for viewing through a browser or a specially-constructed app installed on the device 102, or as an internal resource accessible through a virtual private network (VPN) connection for enterprise users to access remotely when they are not on the corporate intranet. Dashboard server 103 may broadcast information such as status changes or notification alerts to notification hub 104 for use in producing notifications to send to device 102. When sending notifications, notification hub 104 may use a vendor-operated messaging server 105 (such as for APPLE IMESSAGE™) to look up a registered device and send a notification via the messaging server 105 to the appropriate device 102.

FIG. 2 is a flow diagram of an exemplary method 200 for operating a mobile dashboard for automated contact center testing, according to an aspect. In an initial step 201, a mobile device 102 may connect to a dashboard server 103 and log in to an account. In a next step 202, mobile device 102 may view a dashboard application and receive initial dashboard information such as status messages and notifications from dashboard server 103. In a next step 203, mobile device 102 may register with a notification hub 104 for notification alerts, enabling the receipt of alerts without a connection to dashboard server 103 by using existing communication methods such as SMS or web-based messaging, that may be sent to mobile device 102 via a network 101 without an active connection to dashboard server 103 or an active dashboard application instance. In a next step 204, dashboard server 103 may send information updates to notification hub 104, which may then 205 look up registered mobile devices 102 that may be associated with a received update (for example, an IT administrator's device that is registered to receive outage alerts for a particular server), and may then 206 send appropriate notifications to any registered devices found. When a mobile device 102 receives a notification 207, it may then retrieve updated information 208 from dashboard server 103 for example by refreshing an idle dashboard display or retrieving new information in the background so that the next time the dashboard is viewed or brought to the foreground, it will reflect the most recent information available (rather than displaying the information available when it was last viewed, requiring a manual refresh to fetch new information at that time).

Figure 3:
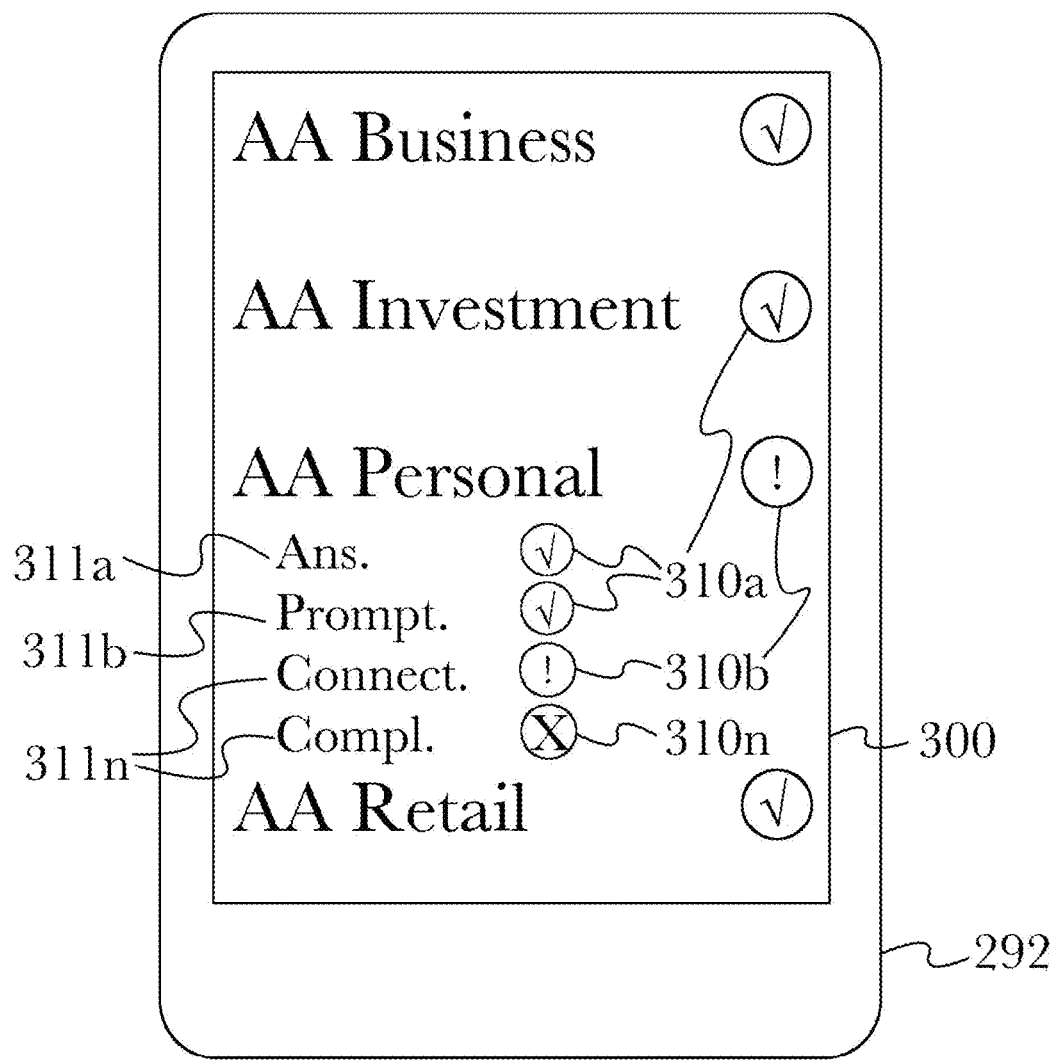
FIG. 3 is an illustration of an exemplary screen of a mobile dashboard app, according to an aspect.

FIG. 3 is an illustration of an exemplary screen 300 of a mobile dashboard app 292, according to an aspect. According to the aspect, a mobile dashboard 300 may comprise a software application 292 operating on a user's mobile deuce 291 to present information and optionally receive input from a user such as via a touchscreen hardware interface of a user's mobile device 291, and may comprise a modified version of an executive dashboard displayed on, for example, a contact center wallboard or large screen display. Mobile dashboard 300 may be used to provide an easy to read visual representation of various contact center operation data collected by a dashboard server 290, for example including (but not limited to) relevant test case results from a current operational testing program. Each screen, such as that shown in FIG. 3, may present data corresponding to one or more particular service groups (for example, according to the present aspect, "AA Business", "AA Investment", "AA Personal", and "AA Retail").

Visual indicia 310*a-n* may be presented to display the result of the execution of a test case (or test cases) from a test campaign, based on a specific category of test. These indicia 310*a-n* may, be used to represent successful tests 310*a*, failed tests 310*b*, or satisfactory tests that passed but have one or more warnings or conditions 310*n* that may require attention (for example, if an operational threshold is not exceeded, but is nearly exceeded, a test may have passed, but with a caution or warning). For each service group 311*a-n*, generic categories may be predefined to display various aspects of a test case result. For example, a category could be "Answering" 311*a*, and a checkmark may indicate a test call answered correctly (indicating that step 0 was successful), while an "X" indicator may mean a test call was not answered correctly (i.e. Step 0 was unsuccessful). In another example, a category could be "Correct Prompts" 311*b*, wherein a checkmark means speech recognition results in all test case steps were above a minor confidence threshold, while an "X" means speech recognition results in a test case step were below a major confidence threshold, and "!" may mean speech recognition results in a test case step were within a satisfactory range as defined with a major/minor confidence threshold). The number, identities, and arrangement of categories, indicia or results displayed may vary and may be configured by an administrator via dashboard server 290. According to some arrangements, an overall percentage score fora service group may optionally be computed (either by dashboard server 290 or by a specific instance of mobile dashboard application 292).

According to an aspect, a dashboard gives up-to-the-minute status reports on your customer experience, enabling you to make operational decisions and drill down to the source of an issue while on the go. A mobile-optimized executive dashboard display can be customized for each unique user, so business and technical stakeholders can filter the display for the customer experience (CX) metrics that are most relevant to them, and configure push notification alerts accordingly.

Built on top of an easy-to-use and intuitive CX testing and monitoring product on the market, described below with respect to FIG. 2, the mobile dashboard also provides the ability to look at CX failures and delays in detail and even listen to calls so you can hear what went wrong. A ticker feature built into the mobile dashboard improves team communication and drives fluster incident response and resolution by showing relevant messages to stakeholders across the business. The mobile dashboard can be configured to monitor other vendors' systems through REST API calls.

The mobile dashboard may be implemented as an extension of an executive dashboard system such as those used in wallboards and web-based interfaces, according to the art, extending the functionality of such executive dashboards by snaking personally-configurable dashboard applications available on mobile devices. The mobile dashboards receive real-time test results from contact center monitoring and testing systems, and provide ticker-style real-time notifications of test events that may require attention.

Figure 4:
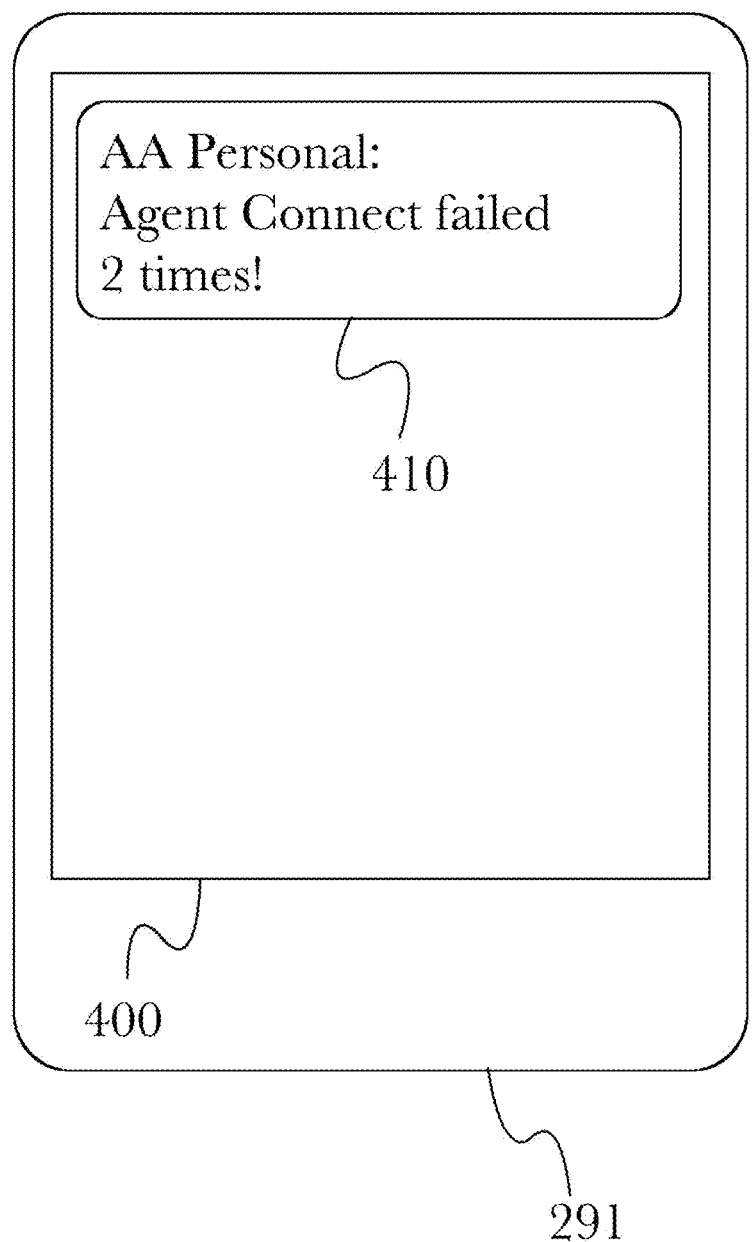
FIG. 4 is an illustration of an exemplary screen showing an urgent alert notification overlaying a mobile device home screen, according to an aspect.

FIG. 4 is an illustration of an exemplary screen 400 showing an urgent alert notification 410 overlaying a mobile device home screen 400, according to an aspect. Alerts may be sent by dashboard server 290 based on configured criteria or thresholds, such as (for example) whenever a test case fails or when a service group's aggregate performance falls below a threshold, or ins other test failure situations. When an alert is received at a mobile device 291, a notification 410 may be displayed to alert the user, optionally presenting details of the alert conditions such as (for example) a service group or failure type. In some arrangements, notification 410 may be interactive, offering, a user quick actions that may be triggered by interacting with their device 291, such as by taping or swiping, for example to acknowledge the alert or to take a preconfigured action in response to the alert.

Figure 5:
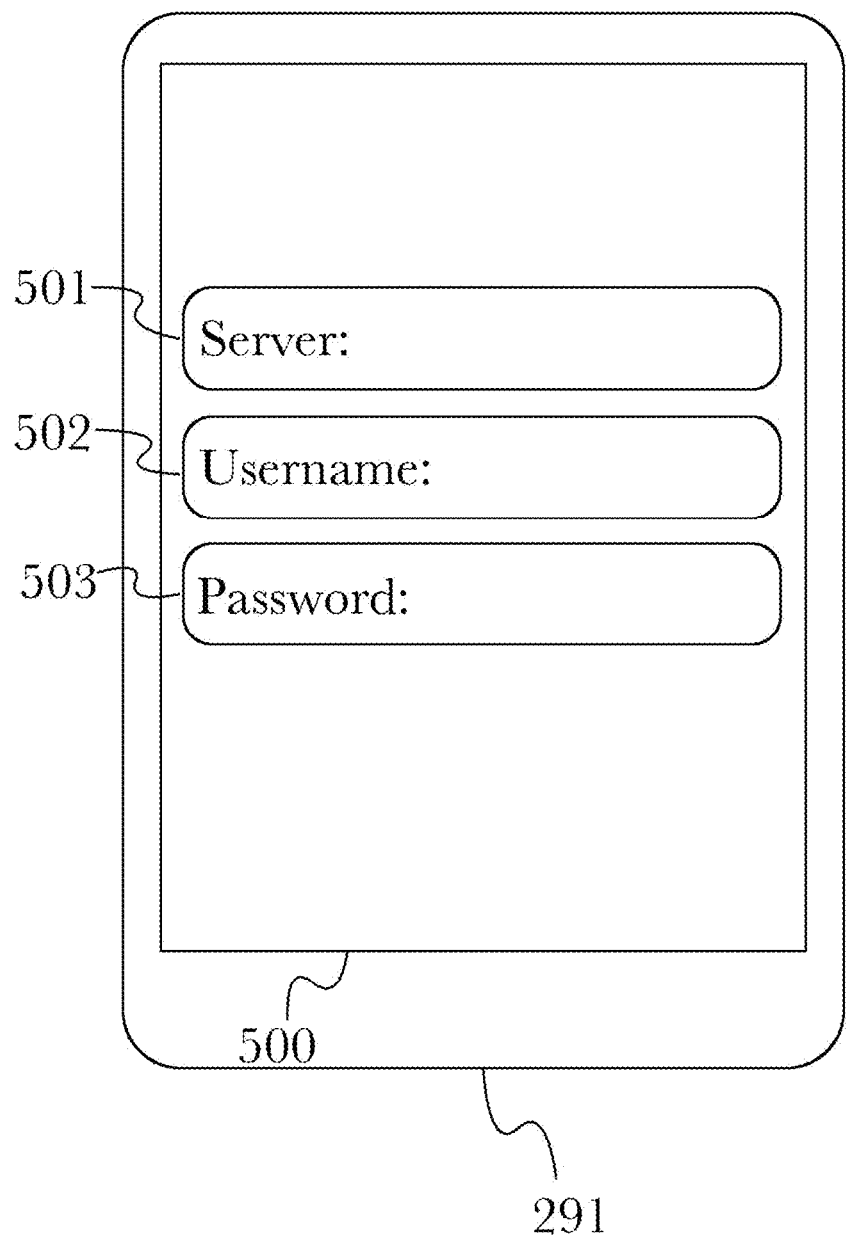
FIG. 5 is an illustration of an exemplary screen showing a mobile dashboard login window, according to an aspect.

FIG. 5 is an illustration of an exemplary screen 500 showing a mobile dashboard login window, according to an aspect. According to the aspect, a user may use their mobile device 291 to log into a mobile dashboard app, providing their login credentials via a login screen 500. Credentials may include, but are not limited to, a user's unique username 502 and password 503, as well as optionally a server or site 501 to specify a particular site or dashboard they wish to access. For example, a user may have access to multiple site dashboards and select which one they wish to view at a particular time, such as to monitor different sites throughout the day (for example, for IT or security personnel), or to monitor different dashboards on different mobile devices 291 using a single user account (using the same username 502 and password 503 on each device, but with different server/site 501 specified).

Figure 6:
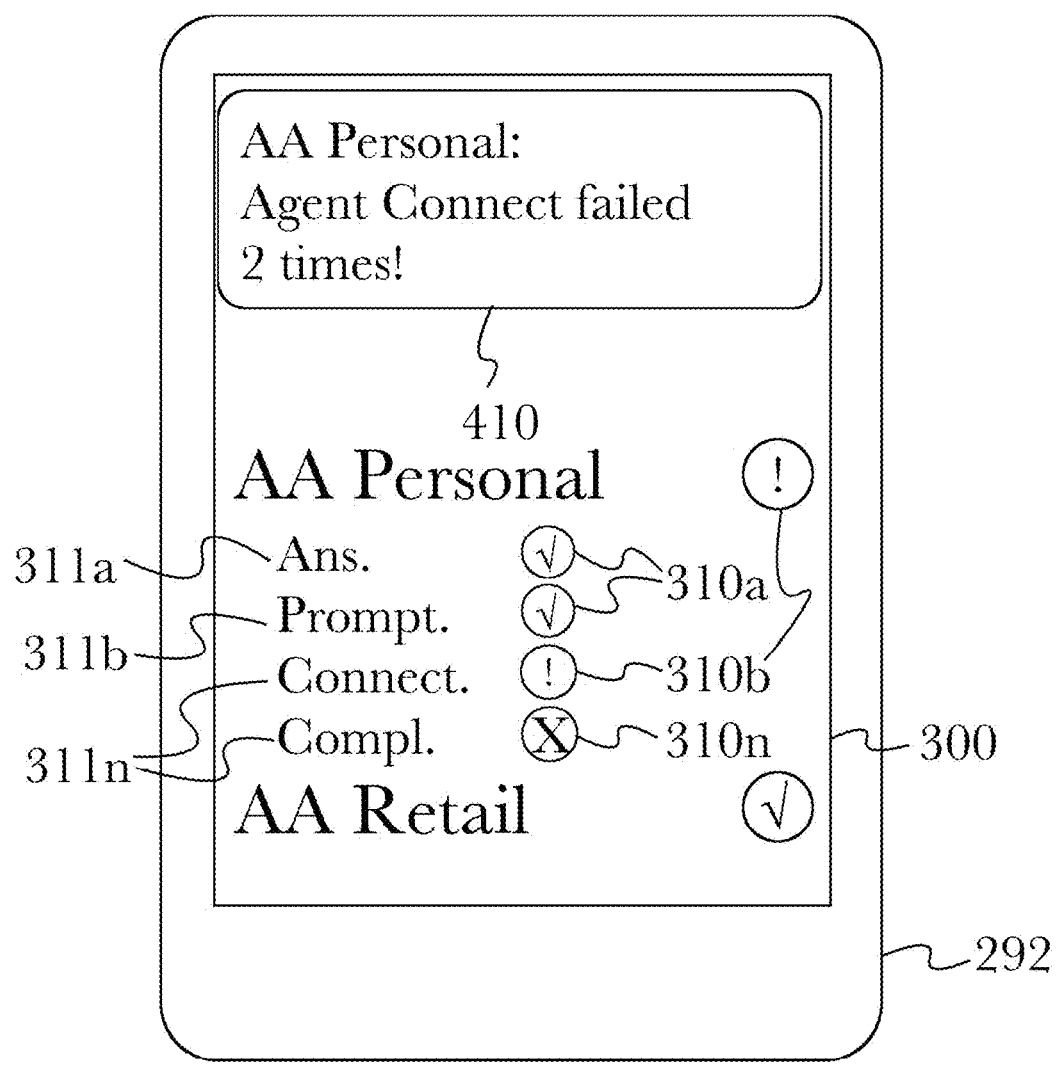
FIG. 6 is an illustration of an exemplary screen showing a mobile das app with an urgent alert notification, according to an aspect.

FIG. 6 is an illustration of an exemplary screen showing a mobile dashboard app 300 with an urgent alert notification 410, according to an aspect. According to the aspect, an alert 410 may be presented within a dashboard application 300, overlaying alert information over the current screen in the dashboard to bring alert information to the foreground, prompting the user's attention. For example, while a user is monitoring service groups in dashboard 300, if an event that requires immediate attention occurs (such as a failure threshold being met, for example), a notification 410 may be overlaid on the service group screen, ensuring the user is aware of the alert so they may take any necessary action. As with home screen notifications 410 as described previously (referring to FIG. 4), immediate actions may optionally be available via tapping or swiping on the notification 410 or otherwise interacting with the mobile device 291.

Figure 7:
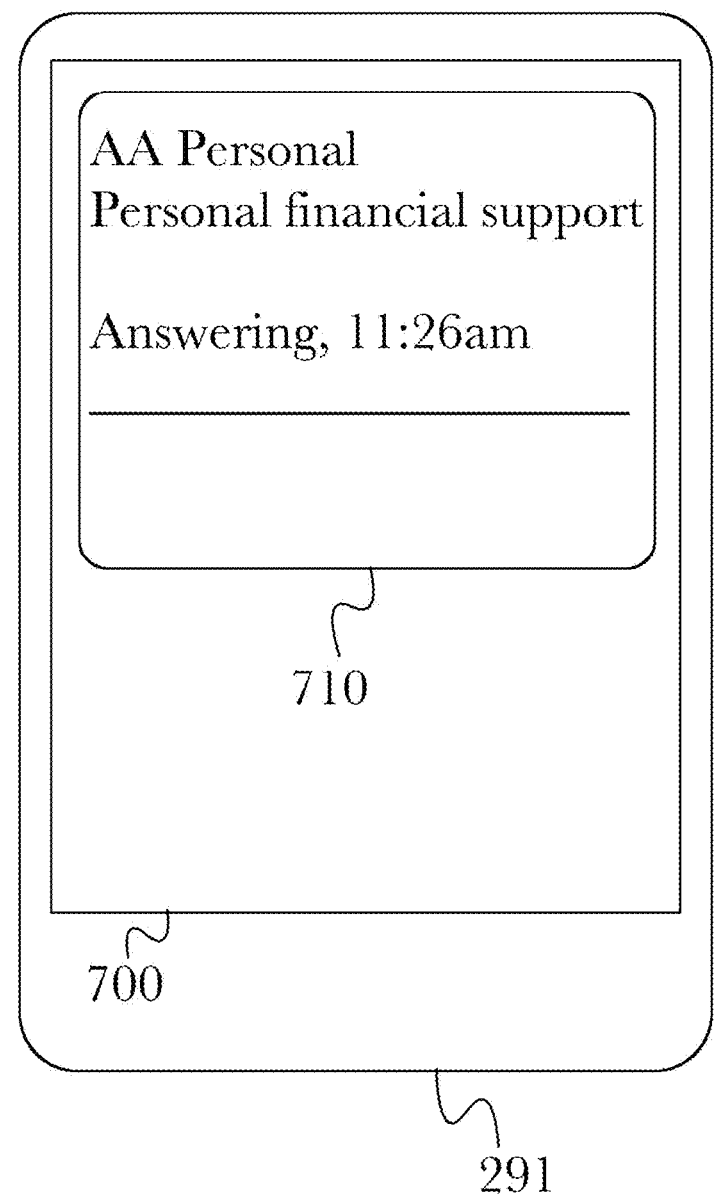
FIG. 7 is an illustration of an exemplary screen showing a mobile dashboard app urgent alert response dialog, according to an aspect.

FIG. 7 is an illustration of an exemplary screen 700 showing a mobile dashboard app urgent alert response dialog 710, according to an aspect. According to the aspect, an alert response dialog 710 troy be presented when a user responds to an urgent alert notification 410 (as described previously, in FIG. 4 and FIG. 6), to inform other users who may have received the original notification 410 that it is being addressed. Response dialog 710 may optionally include information from the original alert such as a service group or failure count, as well as information pertaining to the response such as the timestamp for the response, or user information to identify who is responding to the alert.

Figure 8:
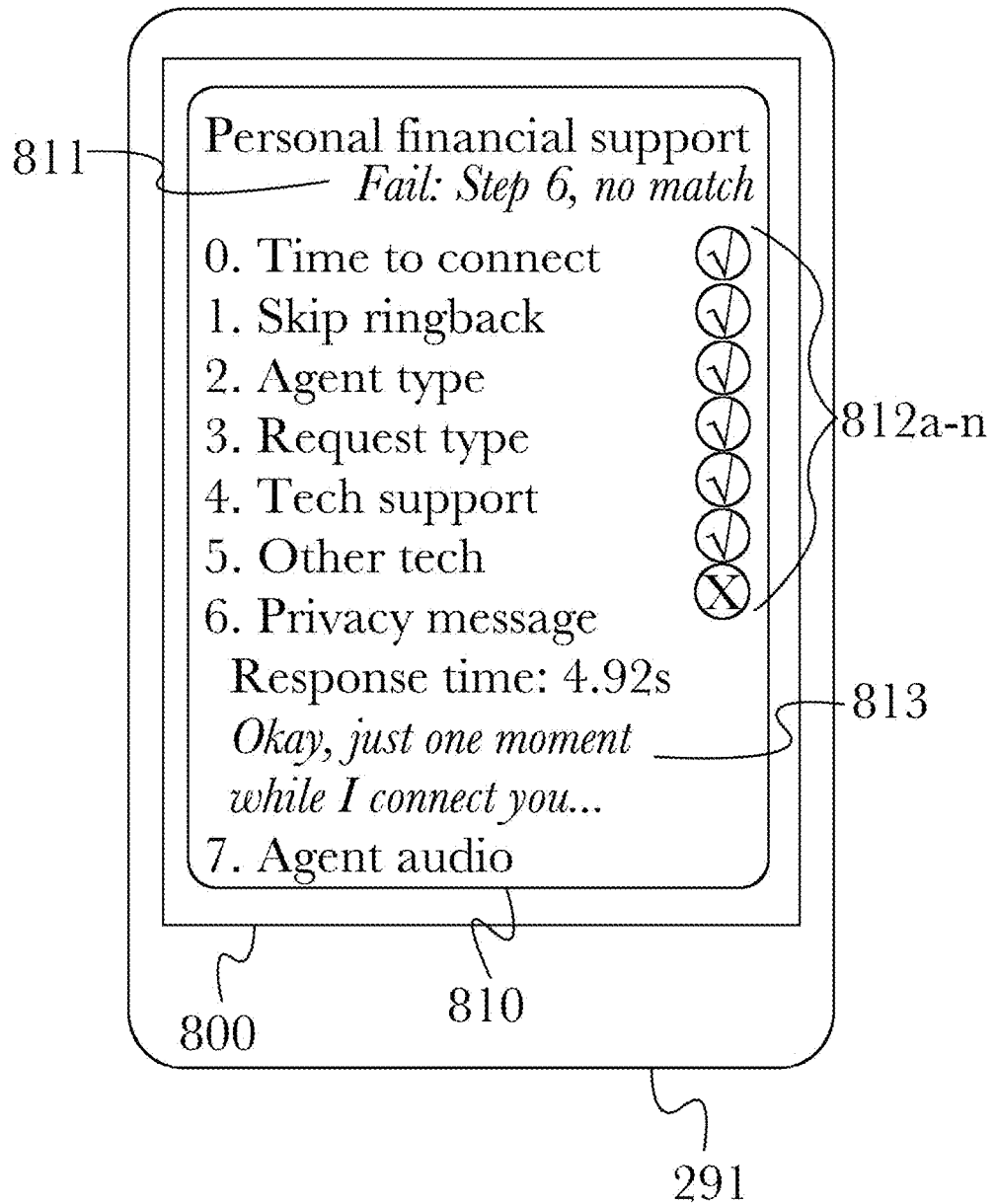
FIG. 8 is an illustration of an exemplary screen showing a mobile dashboard app urgent alert drilldown window according to an aspect.

FIG. 8 is an illustration of an exemplary screen 800 showing a mobile dashboard app urgent alert drilldown window 810, according to an aspect. According to the aspect, a drilldown window 810 may present detailed information for an urgent alert, exposing additional information to assist a user monitoring the dashboard app on the mobile device 291. A drilldown may show a summary of the failure event 811, for example briefly describing the cause of failure, while more detailed steps and their individual resolutions may be displayed 812*a-n* for individual review. At a failed step, additional failure details may be shown 813 to aid the user in identifying the specific cause of failure when possible. A user may then interact (for example, tapping or clicking) with their mobile device 291 to bring up a detailed test case drilldown window 910, as described below in FIG. 9, to examine the failed test case step further.

Figure 9:
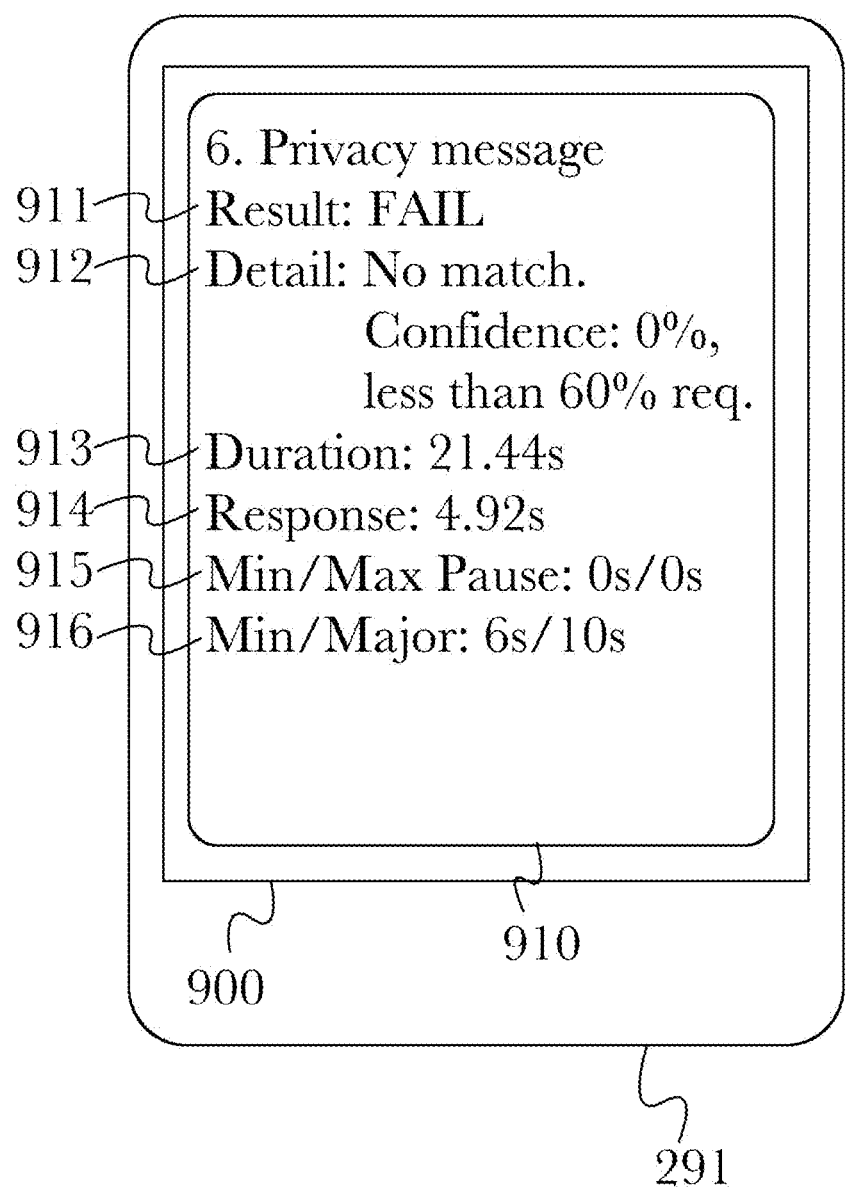
FIG. 9 is an illustration of an exemplary screen showing a mobile dashboard app test case drilldown window, according to an aspect.

FIG. 9 is an illustration of an exemplary screen 900 showing a mobile dashboard app test case drilldown window 910, according to an aspect. According to the aspect, a test case drilldown window 910 may be viewed from an alert drilldown window 810 by interacting with a specific test case in the dashboard app interface, to view or interact with additional test case details. The drilldown 910 may display the result 911 of the test case execution, as well as detailed comments 912 concerning the nature of the result (for example, the reason for a test failure result, as shown in this aspect). Additional test case details may be shown, such as the duration 913 and response time 914 for an agent interaction, pause time thresholds 915, or minimum and maximum threshold lines 916 according to a current metric configuration in use.

Figure 10:
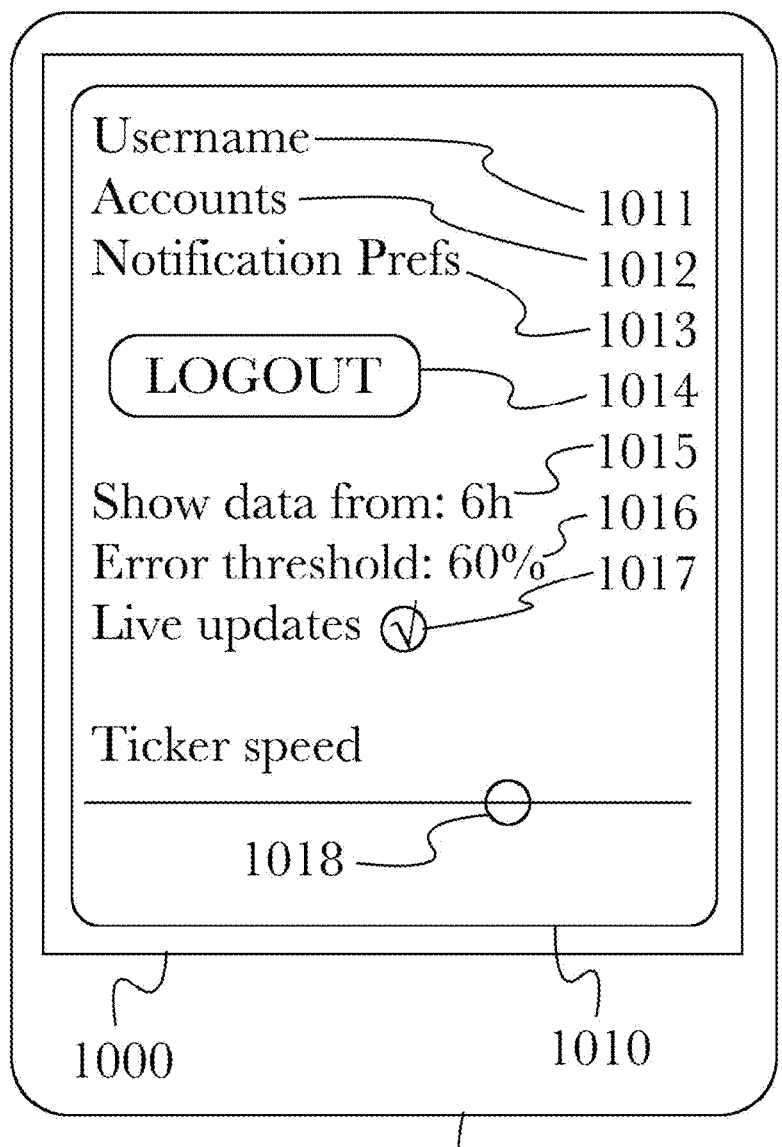
FIG. 10 is an illustration of an exemplary screen showing a mobile dashboard app settings window, according to an aspect.

FIG. 10 is an illustration of an exemplary screen 1000 showing a mobile dashboard app settings window 1010, according to an aspect. According to the aspect, a user may configure settings for a dashboard app on their mobile device 291 using the settings interface window 1010, configuring per-user or per-device settings as needed for monitoring and interaction with the dashboard and alert notifications. Options may be provided for a user to input or alter their account information such as their username 1011 or to view their connected accounts 1012 (for example, if a user has access to multiple sites, as described previously in FIG. 5), as well as to logout 1014 from their current account. A user may also configure notification preferences 1013, for example to decide which notifications they wish to receive or how/when to present them (for example, to disable home or lock screen notifications, or to modify notification persistence settings for missed notifications). Dashboard settings may be modified, which may directly modify the appearance or behavior of the user's particular instance of the dashboard application on their device 291. Exemplary dashboard settings may include (but are not limited to), setting a time window for data to be presented 1015 to select how much data to display at, one time on the dashboard, setting an error threshold 1016 to determine the conditions of a failure alert for an particular test case, selecting whether or not to view live updates 1017 to determine whether a user is viewing historical of snapshot data (that is, the data presented is not changing in real-time) or whether they are viewing a live display of information as it changes, or to select the refresh speed 1018 of an information ticker, to determine how quickly the information presented changes while being viewed.

The mobile dashboard application disclosed herein is designed so that the current/potential clients can easily monitor and quantify the interactions their users (clients) go across in real time, when they interact with the contact center. The apps helps the executives to uniquely identify the connected journeys and easily monitor how well the designated portion of the contact center they are responsible for is performing. By continuously summarizing and graphically visualizing all the user interactions as different connected journeys the app allows the users to monitor the cx summary of their contact center from their own mobile device. Along with this, the notification feature of the app keeps the (app) users updated about the status of the various journeys their clients are taking across different sections of the contact center.

Figure 17:
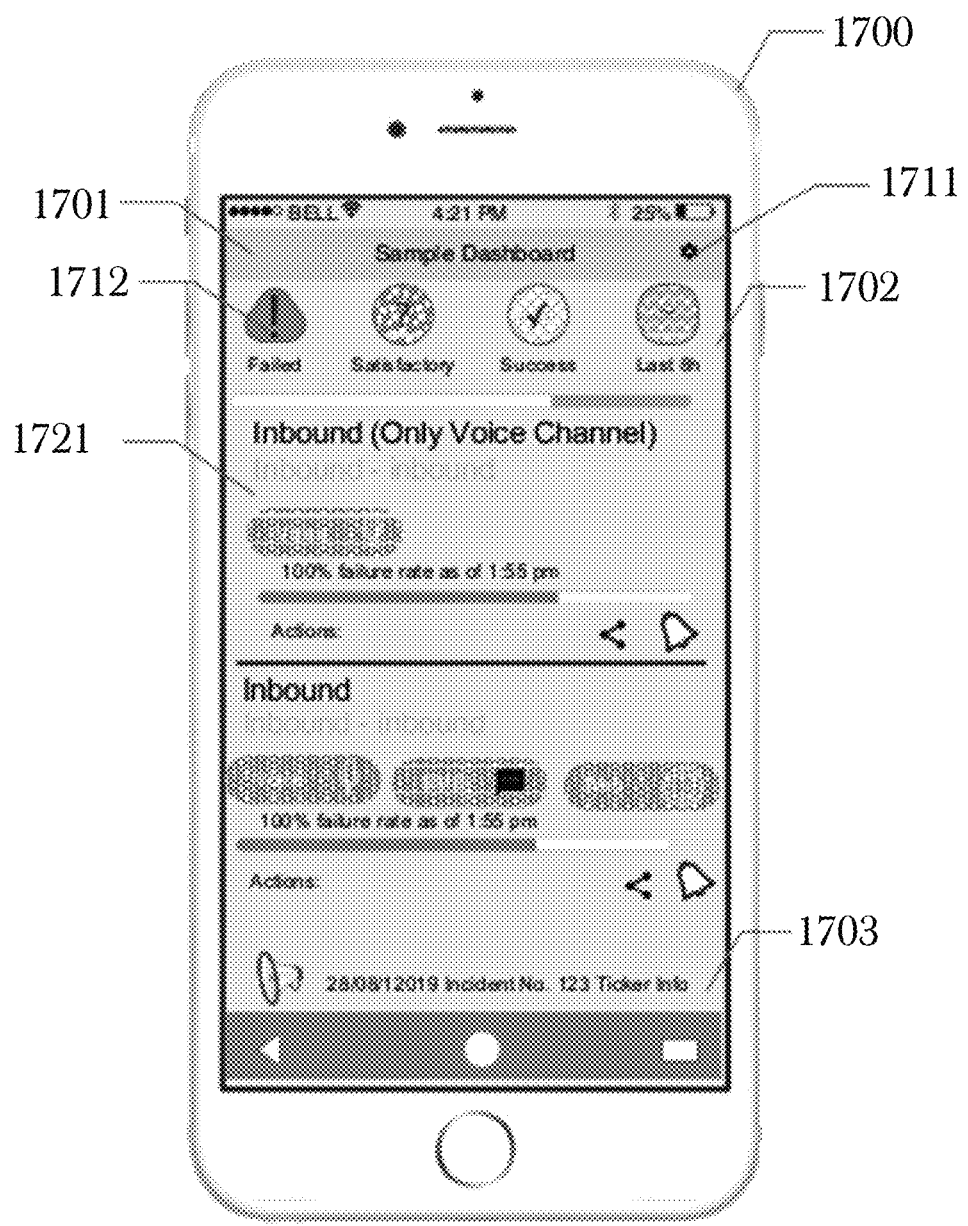
FIG. 17 is a user display screen for mobile dashboard illustrating inbound customer service calls, according to one aspect.

FIG. 17 is a user display screen 1700 for mobile dashboard illustrating inbound customer service calls, according to one aspect. 'Lite Incident Manager Screen allows the users to view the current state of all the journeys categorized as 'Failure', 'Satisfactory' and "Success' as well as preview the success rate of service groups through the CX Summary (4th tab).

The Incident Manager is made up of the following sections: a Header Section 1701, an Incident Manager Journey Section 1702, and a Dashboard Tickers Section 1703. The header 1701 of the Incident Manager Screen contains a button 1711 to navigate to the settings screen of the app. To easily recognize which dashboard the user is viewing, the name of the dashboard is displayed in the center of the header bar. Right underneath is the tab control 1712 which allows the user to switch between journey status, whereby tapping on each status focuses on the journeys currently in that status. Alternatively, users can also tap on the CX Summary tab (4th tab), where the screen will display a graph with the success rates of each service group.

Underneath the status tab control, there is a list of journeys 1721 that are in the current dashboard. Each journey is represented as a card with a quick, high level summary of the journey containing information such as the name, average failure rate, failure history and channels. Tapping on the carols will navigate the user to their respective details. On a journey card, the user can also see the channels that the journey constitutes. If a journey contains more than one channel, tapping on the card will redirect to 'Incident details', a screen outlining each channels' status. Otherwise, a journey with only one channel will redirect to 'Interaction details'. A user can also share this information through social media via the share button. Displaying new continents and tickets for a given journey can also be achieved by tapping the bell.

Incident Manager Dashboard Tickers 1703 also shown on this screen. If ticker(s) are configured for the dashboard currently in view, data for this incident will be displayed at the bottom of the Incident Manager. The user can traverse through each ticker and preview them for a period of time.

Figure 18:
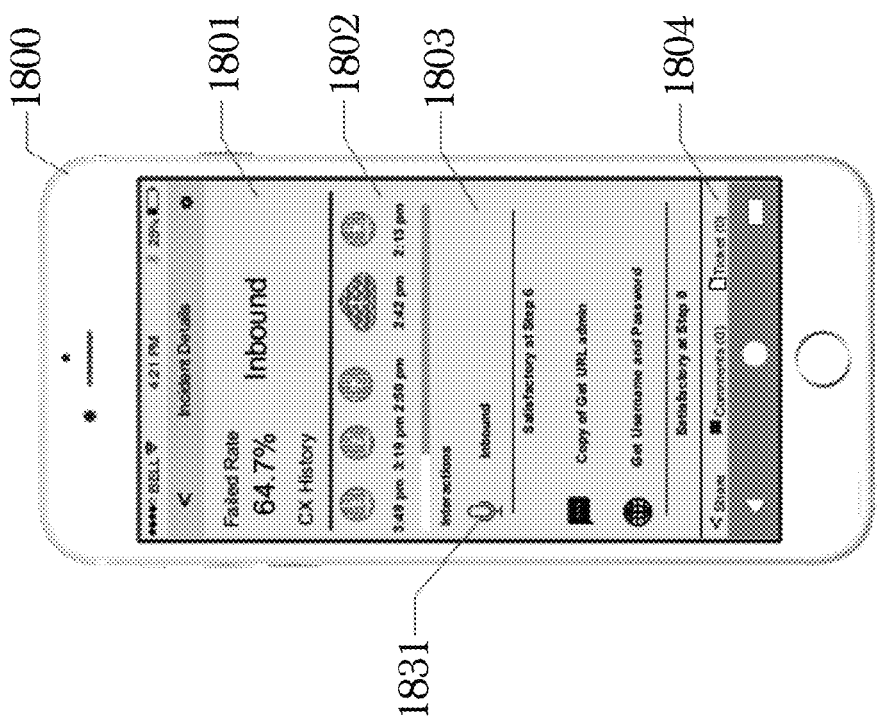
FIG. 18 is a user display screen for mobile dashboard illustrating a particular inbound customer service call, according to one aspect.

FIG. 18 is a user display screen 1800 for mobile dashboard illustrating incident details for a particular inbound customer service call, according to one aspect. When the user taps on a journey with multiple channels, the app navigates to the Incident view, which displays the overall summary of each channel (in the journey) along with their status. The Incident Details screen is further divided up into the following sections: a Header Section 1801, a CX History Section 1802, an Interactions Summary Section 1803, and a Share/Comments and Tickets Section 1804. The Header Section 1801 illustrates basic information regarding this incident. The color of the navigation bar on the incident details screen reflects the overall status of the latest journey run. This section also contains the name and the average failure rate of this journey.

The CX History control section 1802 displays the status of each in at the given times outlined. Using the same icons and colors and the Incident Manager, users can determine the overall outcome of a given run. Users can also scroll through and tap on any history item to display the respective interactions underneath.

The Interactions Summary section 1803 shows a summary of the different interactions in this journey. These interactions can be of the same or different types of channels 1831. When an interaction is unsuccessful, there is a small message underneath outlining the reasoning for the current status. Tapping on an interaction redirects to the respective interaction details for that channel.

At the bottom of the screen, an Incident Details Footer 1804 provides users a, mechanism to choose one of three options. Tapping on share will display the possible options to share this information to. Users can also view or create comments and tickets that are currently associated with this journey. The comments and tickets that are displayed here are for the latest run of that journey.

Figure 19:
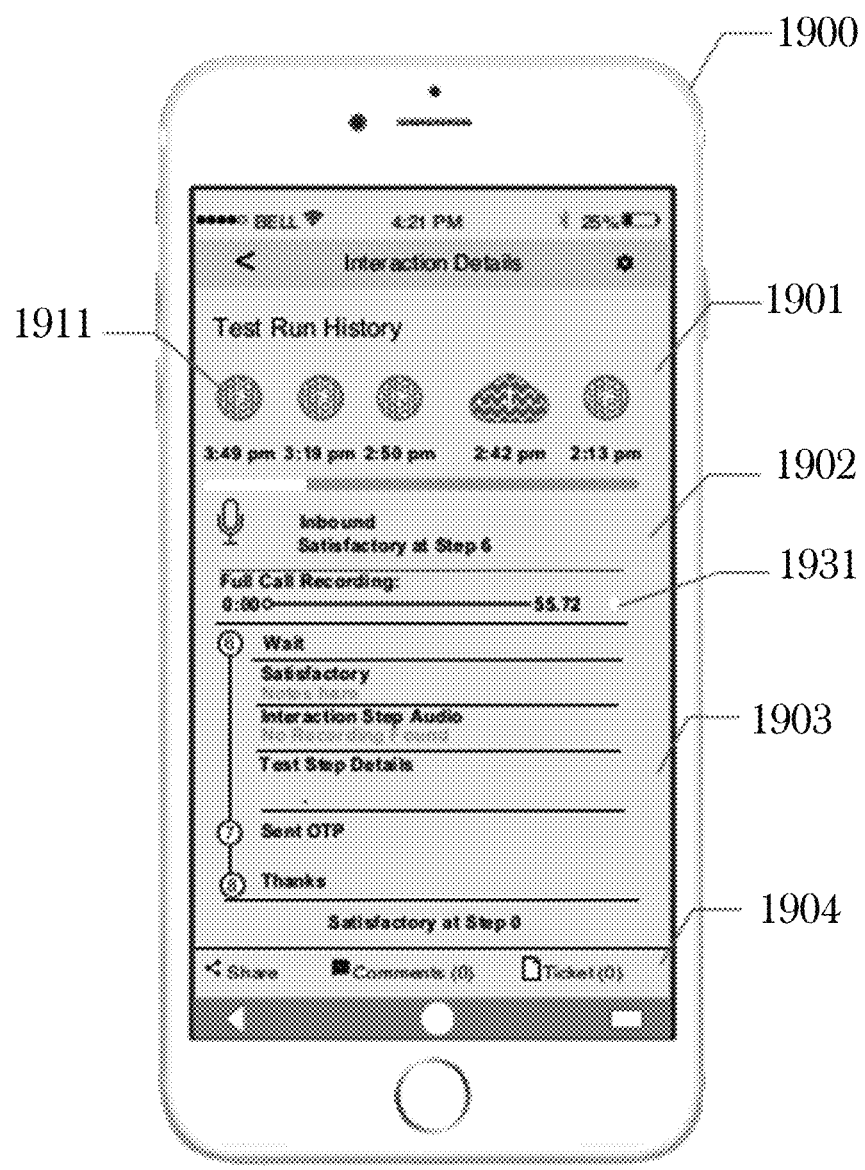
FIG. 19 is a user display screen for mobile dashboard illustrating details of one step of a particular inbound customer service call, according to one aspect.

FIG. 19 is a user display screen 1900 for mobile dashboard illustrating interaction details of one step of a particular inbound customer service call, according to one aspect. An Interaction Details screen provides users a representation of call data when he or she navigates to a specific channel in an omnichannel journey or viewing a single channel journey. The Interaction Details outlines each step's status along with the detailed information regarding the step(s). Interaction Details is slightly different depending on which channel the user is viewing, containing information that is only relevant for the respective channel. The interaction Details screen 1900 is broken up into the following sections: an interaction Run History section 1901, an Overall Results and Media Control section 1902, an Interaction Steps/Step Details section 1903, and a Share/Comments and Tickets section 1904.

The Interaction Run History section 1901 summarizes the status of the channel interaction of the overall journey. Tapping on the interaction times 1911 will update the rest of the screen with the relevant information for that run. Below the Interaction Run History section, users get a preview of the interaction run results 1902. This section contains the interaction name and the status. More information can be displayed by tapping the three dots, where a modal appears over the top of the view 1931. Extra details may be provided in Overall Results and Media Control section 1903 along with any media control(s) that represents the multimedia for the current channel (not shown). This dialog may provide additional details such as a description and run time for the interaction step. Ira channel uses media controls, the user may activate the media as well. The Share/Comments and Tickets 1904 section provides controls to permit the user to share the information, add continents to the incident data and view any related tickets for this incident.

Figure 20:
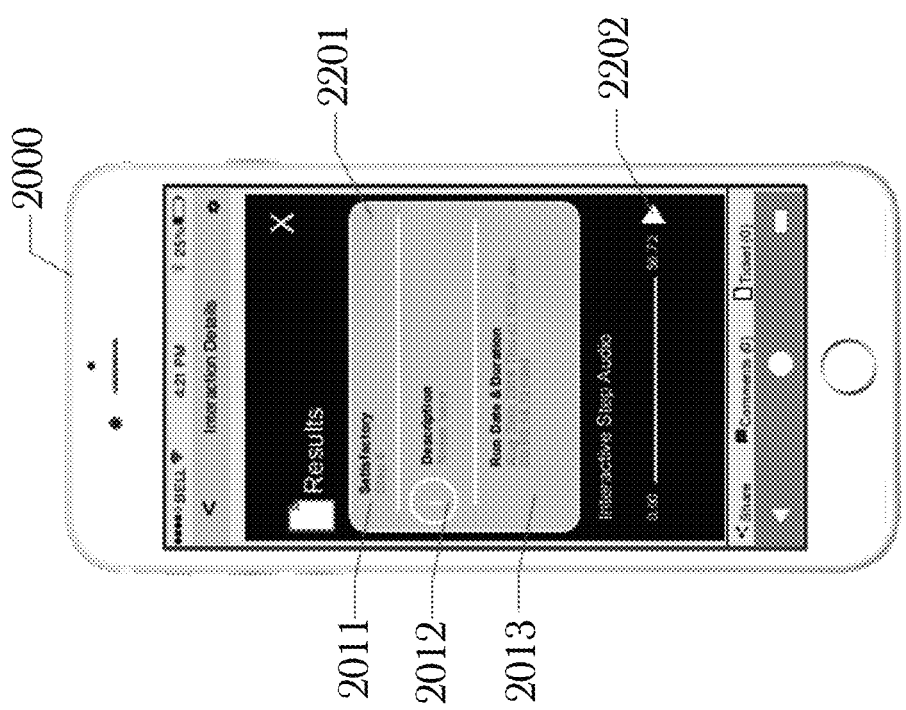
FIG. 20 is a user display screen for mobile dashboard illustrating results from a particular inbound customer service call, according to one aspect.

FIG. 20 is a user display screen 2000 for mobile dashboard illustrating results from a particular inbound customer service call, according to one aspect. When a user taps of a results control of the incident details screen, a dialog box 2001 containing the additional data is presented. This additional data may include a statement of the results such as failed, satisfactory, or success 2011. This dialog box may also include a detailed description 2012 of the step in the incident data, being reviewed and runtime and duration data 2013 when available. This additional data also lists out all the steps within a single interaction. It details the status of each step and auto expands the first step that did not pass the success threshold. The user can individually expand each step to view the interaction step detail. Media controls specific to the step are also available. For voice and web, the audio 2002 and the screenshot for the step are available respectively.

Figure 21:
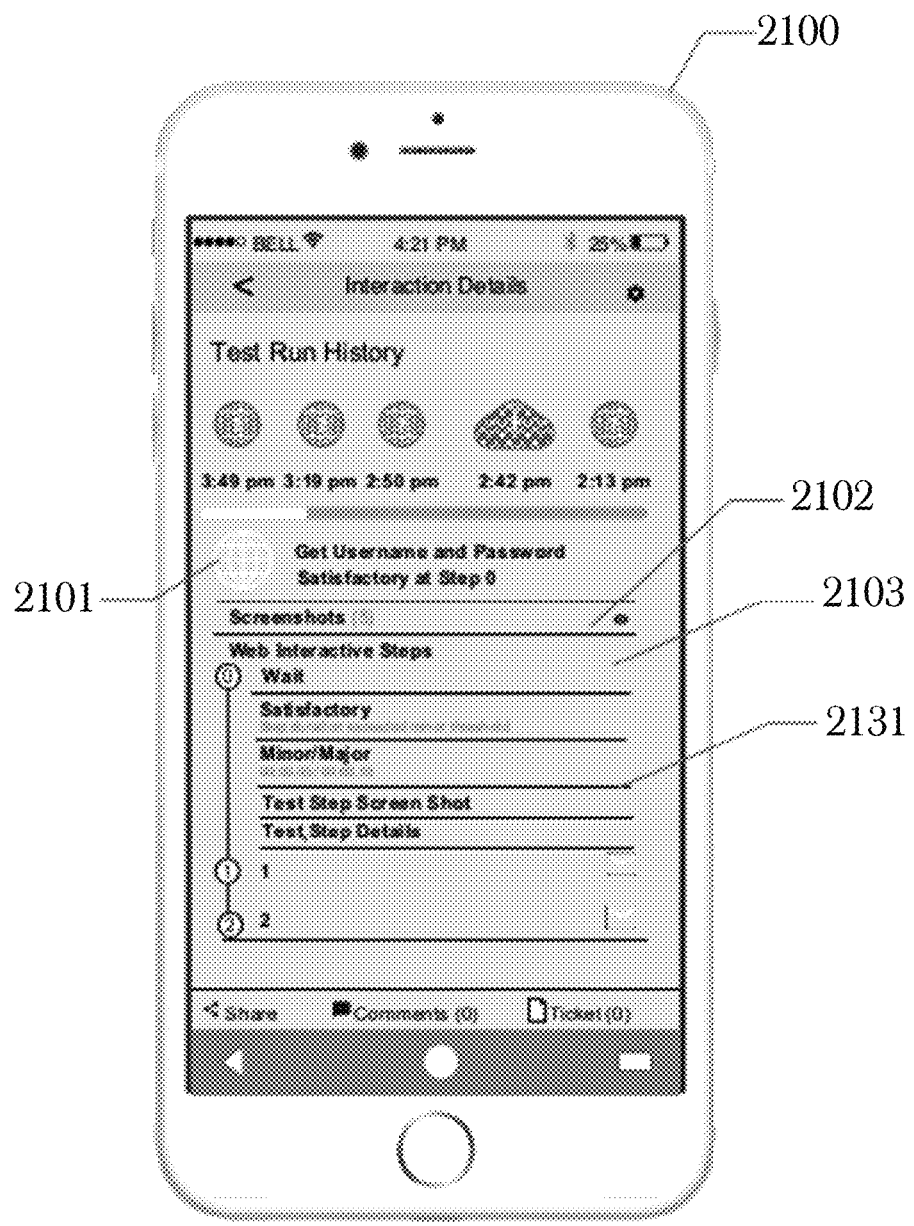
FIG. 21 is a user display screen for mobile dashboard illustrating details of a web based step of a particular inbound customer service call, according to one aspect.
Figure 22:
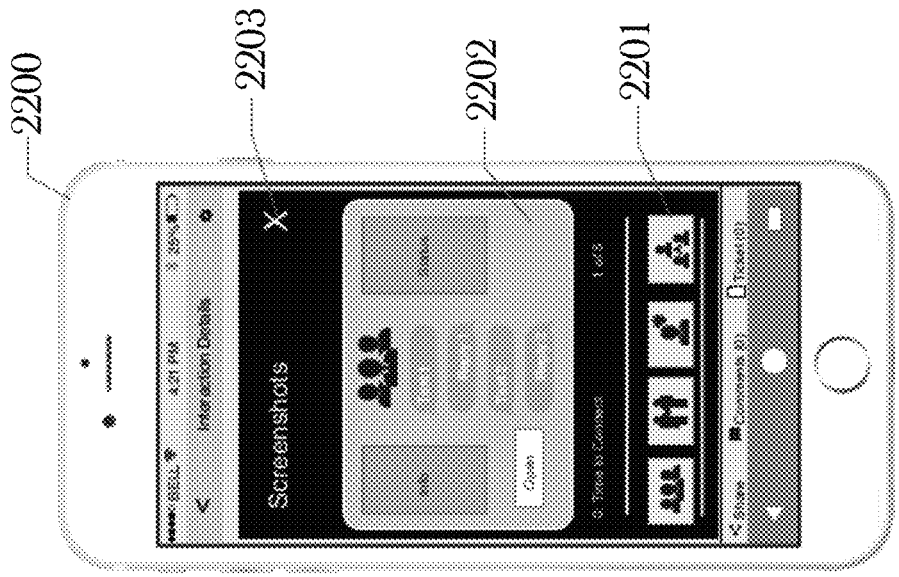
FIG. 22 is a user display screen for mobile dashboard illustrating screenshots from another particular inbound customer service call, according to one aspect.

FIG. 21 is a user display screen for mobile dashboard 2100 illustrating details of a web based step 2101 of a particular inbound customer sew ice call, according to one aspect. When a user taps on the screenshot section 2102 of the Interaction Details screen, the application navigates to display one or more screen 2200 shots taken from this interaction as shown in FIG. 22. Users may scroll between the saved screen shots using the scrolling sets of thumbnail images 2201 for these screen shots to select one of them for viewing 2202. Once a review of the screenshots is complete, the screen may be closed 2203 to return the user to the Interaction Details screen of FIG. 21.

Interaction Steps section lists 2103 Out all the steps within a single interaction. It details the status of each step 2103 and auto expands the first step that did not pass the success threshold 2131. The user can individually expand each step to view the interaction step detail. Media controls specific to the step are also available. For voice and web, the audio and the screenshot for the step are available respectively.

Figure 23:
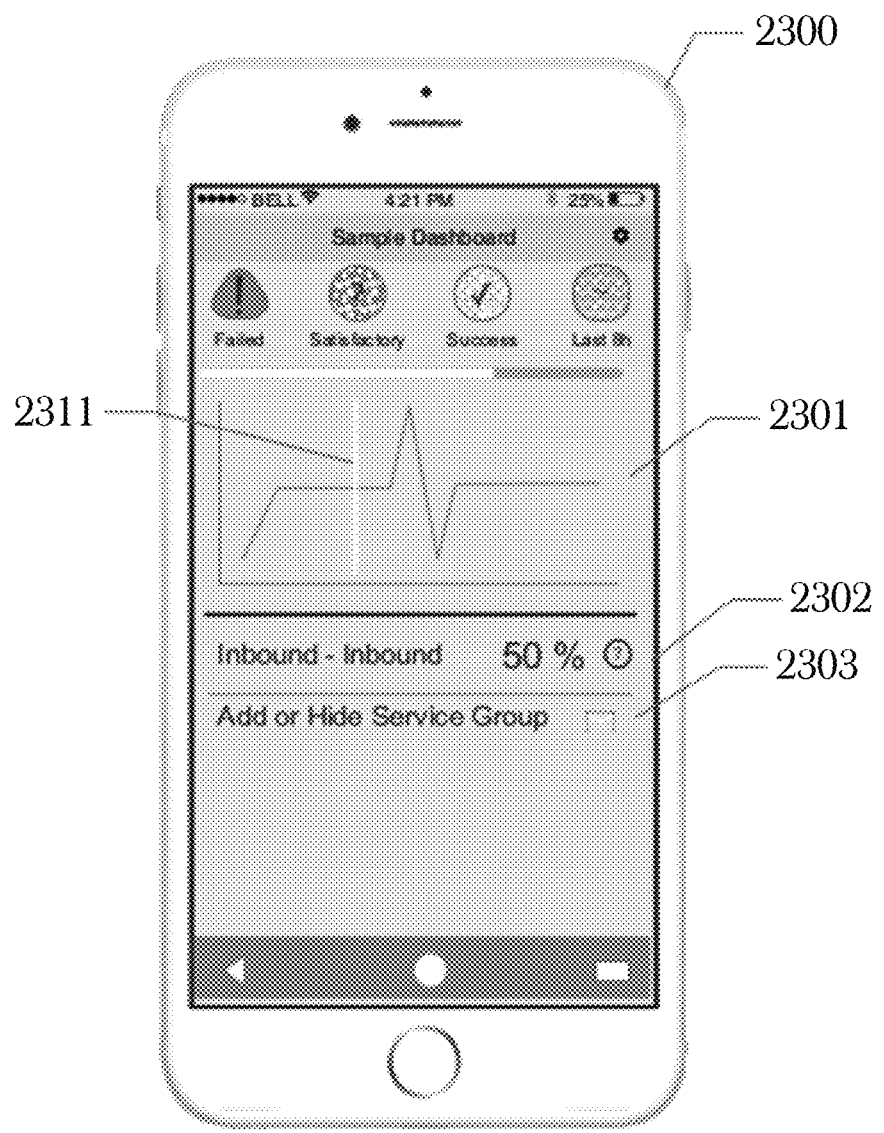
FIG. 23 is a user display screen for mobile dashboard illustrating time based set of results for inbound customer service calls, according to one aspect.

FIG. 23 is a user display screen for mobile dashboard illustrating CX summary 2300 for a set of results for inbound customer service calls, according to one aspect. The CX Summary graph is a tab on the incident Manager screen. This screen provides the user with a high level summary about the health of different service groups that are present on this dashboard. This screen is separated into the following sections: a Summary Graph 2301, a Service Groups listing 2302, and an Add/Hide Service Groups control 2303.

The summary graph 2301 provides users a high level view of the status of a service group for the CX look-back time specified in the settings screen. The user can drag the vertical white line (in the graph) 2311 horizontally to display the success rate of that group. As many groups can be displayed on the graph at once, the lines have been color coded to match the service groups listed underneath. Underneath the graph, there is a list of service groups 2302 that are currently displayed on the graph. Tapping on one of these service groups will expand them to reveal details about this service Group.

Figure 24:
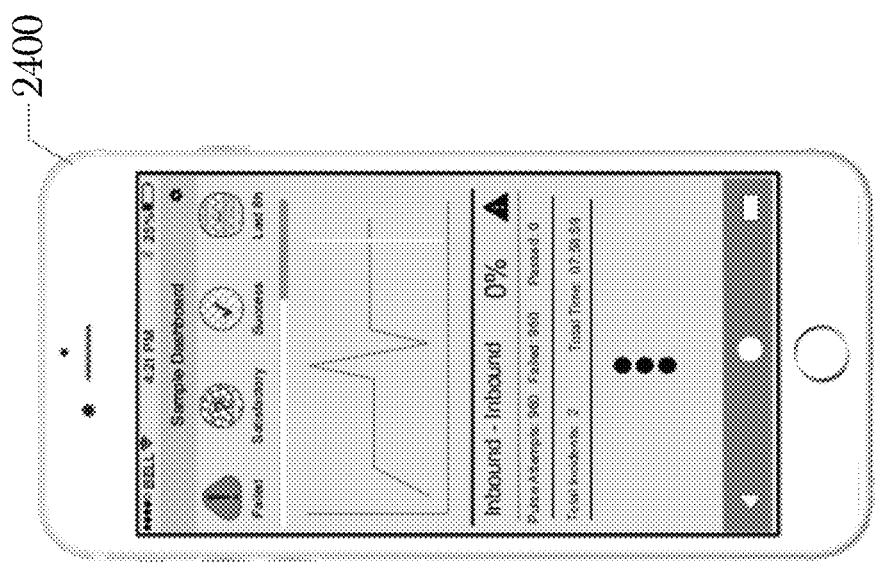
FIG. 24 is a user display screen for mobile dashboard illustrating additional details for a set of time based results for inbound customer service calls, according to one aspect.

The following is a list of the labels that are displayed in Service Group Overview 2302: Pulse Attempts: The number of pulse runs for all the journeys in the service group, in the specified time frame; Total number of failed runs for all the journeys in the service group, in the specified time frame; Satisfactory: Total number of satisfactory runs for all the journeys in the service group, in the specified time frame; Total Incidents: The app identifies an incident when a journey moves from success/satisfactory to failure, where the total number of incidents informs the user about all incidents that, happened in all the journeys in the service group, in the specified time frame; Total incident Time: Total duration in which any journey in the service group was in ivied/satisfactory status; Incident Mean Time to Repair: Mean time it took to repair (or autocorrect) the incidents; Longest Incident Time: Duration for the longest incident for ally journey in the service group, where users can also tap on the arrow on the right side to move the white line (in the graph) to the spot when the longest incident started; Lowest: The lowest success rate for the service group, in the specified time frame, where the users can also tap the arrow on the right side to move the white line (in the graph) to this when this occurred; and Journey/interaction: The different interactions that we run as a part of this service group. Tapping on a symbol redirects users to the Incident/Interaction details 2400 of that instance. An example of such additional data is shown in FIG. 24.

The Add/Hide Service Groups control 2303 permits a user is able to add/hide groups to their liking and these settings will reflect in the CX Summary graph above.

Figure 25:
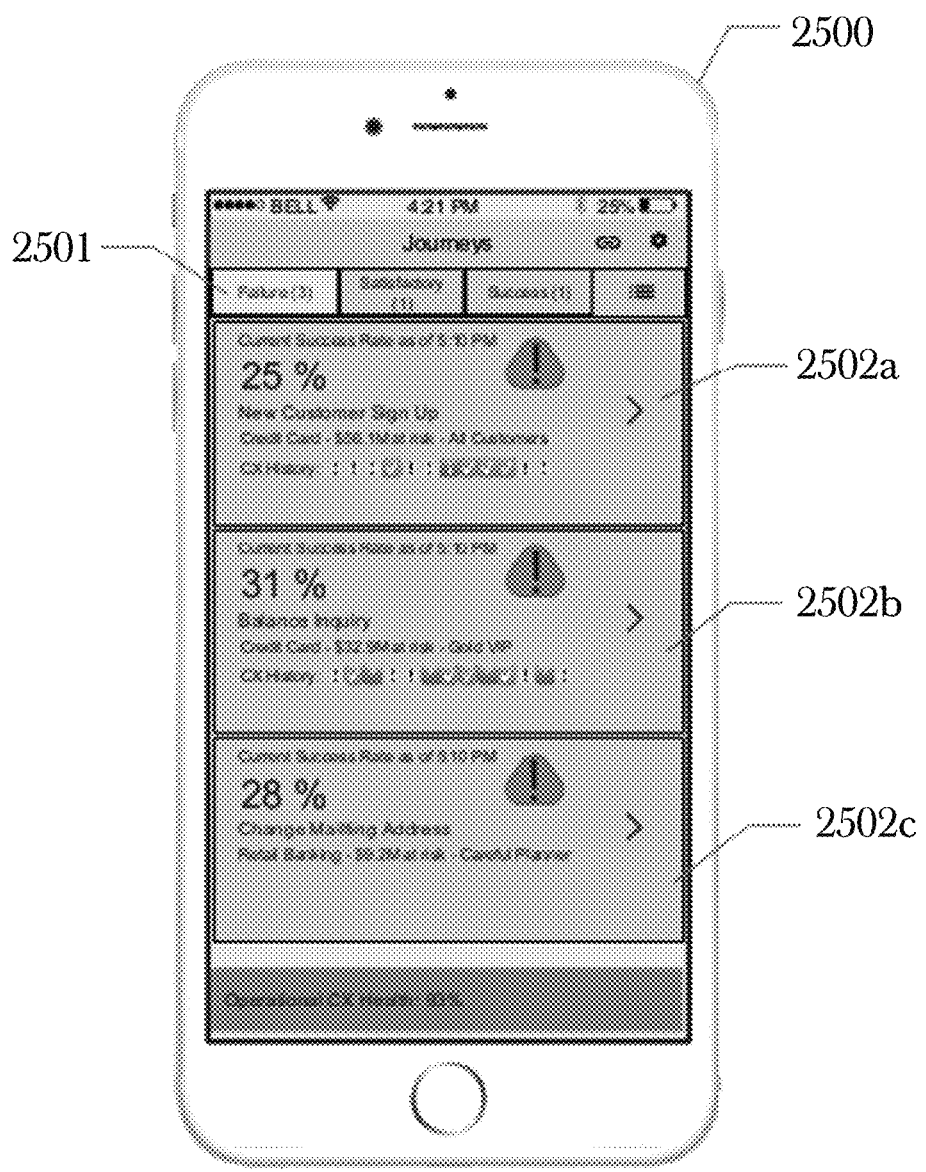

FIG. 25 is a user display screen for mobile dashboard 2500 illustrating journey summary data for inbound customer service calls, according to one aspect. The Journey Screen, also known as an Incident Manager screen, allows the user to view the current state of all the journeys which are categorized as 'Failure', 'Satisfactory' or 'Success'. Each of the three tabs 2501 on the screen show the content of the results data sets of the summary view 2502*a-c* and also give a summary of the different controls and information displayed in the Journey Screen.

FIG. 26 is a user display screen for mobile dashboard illustrating a journey Details Screen 2600 providing details of journey data for one set of inbound customer service calls, according to one aspect. Using the Journey Details Screen, the user can view the journey details screen by clicking (pressing) anywhere in the journey card on the journeys Screen. Based on the functionality and the user interface (U.I.), the journey screen is divided into the following 4 sections: a Header Section 2601, a Metadata Section 2602, a CX History Control section 2603, and an Interactions Summary Section 2604.

The journey Details—Header Section 2601 uses the background (color/image) of this section to reflects the overall status of the journey. Also, this section informs the user about the absolute value of the current success percentage i.e. at the time at which the incident was reported, time at which it was resolved (only for success statuses).

The Journey Details—Metadata section 2602 represents the metadata for the business value. This is the same information which is displayed to the user on the journey Card in the in the journey Screen. This data may include a unique journey name, a business unit responsible for the interaction, a customer group associated with the customer in this interaction, and an estimated monetary impact for the particular journey's value.

The journey Details—CX History Control 2603 allows the user to look back in time i.e. the user can scroll and see how the journey was performing over the last 24 hours (or for the duration set in the settings). When the user clicks/presses an instance in the CX History control 2631, the Interaction Summary section 2604 updates to reflect the summary of the interactions at that instance of time (in the past). It is important to note that the top section does not change as it represents the Overall Summary percentage and values of the journey and not the values at any particular instance.

The journey Details—Interactions Summary Section 2604 shows the summary view of the different interactions that form the journey. These interactions could be of the same or different channel 2641a-2641b. Ideally these should be interconnected i.e. the context in from one interaction should flow to another interaction. Each journey may have more than one interconnected interaction. An interaction may be web 2641a, SMS, voice or email 2641b interaction types of interactions. In an individual interaction fails, the system indicates that the entire journey has failed. Any additional steps in the journey are not executed once this interaction has failed.

A short summary of the reason for the failure is shown to the user. This data is generated at the server or could be from a list of locally saved failures. Users may view a particular interaction by selecting the interaction here. The combination of interactions in a particular journey is distinct to be considered a journey and the interactions in the journey do not change over time FIG. 27 is a user display screen for mobile dashboard illustrating additional interaction details of one particular inbound customer service call, according to one aspect. The interaction details screen 2700 represents the detailed information about the Interaction steps. There are different types of interaction details screens: a Voice Interactions Details channel screen, a Web Interaction Detail channel screen, an SMS Interaction Details channel screen, and an Email interaction Details channel screen. The interaction details screen for all the above 4 different channels essentially has the same structure and comprises of following 4 sections: a Header section 2701, a CX History Control section 2702 is the same control that is displayed to the user on the journey Details screen above. The control keeps the contextual information about the user interaction on the Journeys Screen; a Media control section 2703 that is different for each channel; and a Step details section 2704 that provides the detailed reason behind the success and failure of each individual interaction step. The U.I. and functionality of the CX History control 2702 on the Interaction Details is similar to the U.I. and functionality of the CX History control on the Journey Details as discussed above.

Interaction Details—Header Section 2701 uses the background (color/image) of this section reflects the current status of the interaction. It provides the user with a high level summary of the interaction result. The header displaces data regarding the time when the incident was reported, its current status, and a short summary for a failure.

Interaction Details—Media Control 2703 behaves differently based on the media channel for which the Interaction failure is being viewed. Shown in FIG. 27, a voice channel 2731 is shown. The media control 2732 for the voice channel 2731 allows the user to play the whole audio for the Interaction (test case). This control is also available to the user at the interaction step level i.e. if the user wants she/he can play the audio for the whole test case or only for an individual step.

Interaction Details—Step Details section 2704 of the screen provides the user the capability to view the detailed result of each individual interaction step. This allows to view in detail the reason behind why the interaction and hence why the journey failed. When the user selects/presses the history item the interaction steps reflect the state of the interaction for that particular history item. The interaction step details data provide a user the comprehensive details regarding the cause of a failure. This information is articulated so that a novice user not trained in the technical details of the system troy recognize the cause of the failure. Media controls may be included, when available, to permit the review of the media data, although the type of media data may differ between the channel data types.

The interaction details screen for the web channel allows the users to view the detailed result of each interaction taking place via the web channel (chat or otherwise) in any journey. The functionality and the information displayed in the header section and the CX History control of this screen is similar to the one displayed in the 'Voice Interaction Details'. The media control for the web channel allows the user to navigate among the screen captures and thumbnail images which are generated as a result of the user interaction with the CX via the Web Channel. The media control also allows the user to view a short (compressed) video showing the results for a client (user) interaction. This allows the executives to quickly understand the reason behind any unexpected result/behavior in the interaction.

The interaction details screen for the SMS channel allows the users to view the detailed result of each interaction (either automated or human initiated) between their clients and the contact center. The functionality and the information displayed in the header section and the CX History control of this screen is similar to the one displayed in the 'Voice Interaction Details'. As per current understanding the SMS channel based interactions only include text (plain and multimedia), due to which any special media control is not required to display the information to the user.

The interaction details screen for the Email channel allows the users to view the detailed result of the exchange of information between their clients and the contact center. The functionality and the information displayed in the header section and the CX History control of this screen is similar to the one displayed in the 'Voice Interaction Details'. The email based interactions can include plain text, images and audio files. The multimedia player generated to handle the voice and web channel is used to display the user the detailed information to the User about each individual interaction step (in the Email channel).

FIG. 28 is a user display screen for mobile dashboard illustrating results data for a set of possible results from inbound customer service calls, according to one aspect. Operational CX Health Screen 2800 provides the user a high level summary information about the health of user's contact center for a specific service group or groups, which may be color coded on the graph to match a color label for a specific service group. The values set by the users in the 'Sort, Order and Filter' settings modal on the Journey Screen impact the information displayed to user on the Operational CX summary screen. This screen is categorized into the following 3 individual sections: a summary graph section 2801, a CX history control section 2802, and a journey status section 2803.

This summary graph section 2801 provides the user a pictorial view of the CX health for the last 24 hours (or the duration set by the user in the settings). This graph is interactive i.e. the user can zoom in and out and also select a specific data point on the graph to view the details. A default timeline for the graph is set to a 24 time period. Each data point represents the state of the sit summary state of the CX at a particular instance in time. The summary graph may auto-update in the background should the user remain on this screen. As shown 113 this exemplary graph, there is a point on the graph 2805 that a user may drag the line 2806 to, which will show a 100% success rate for the specified service group. Such a line exists which may be dragged across the graph to determine the success rate and status at a specified time of a group in question 2806.

The CX History control section 2802 is similar to the CX History control on the journey Details and the Interaction Details screens discussed above. The CX History control on this screen allows the view the overall health of the CX (at a predetermined interval). When the user interacts with the CX history control, the Journey Status section of the screen gets updated to reflected status of the journeys at that particular instance of time. It is important to note here that the journeys shown to user here vary and depend on the values set by the user in the 'Sort, Order and Filter' dialog in the Journeys screen.

The journey status section is thither subdivided into a Journey Status Summary section 2803 and a journey Summary List section 2804. The journey status summary provides an interactive and visual representation of the distribution of the journeys comprising the Overall CX state at the select history instance. The journey summary list section provides an interactive list comprising of the name and success percentage of the journeys that fall under the selected status. This part of the journey status section represents the state of the CX system with the use of interactive circular graphs. When a user selects one of the circular graphs that represent either failure 2831, satisfactory 2832, or success 2833, the bottom portion of the section displays a list of journeys having this status. Further, there is a display for the time-limit available for look-back functionalities on a given graph 2834. Lastly, a success rate display may be reflected in this section of the user interface for groups at the specified time on the graph 2801, 2807.

Figure 15:
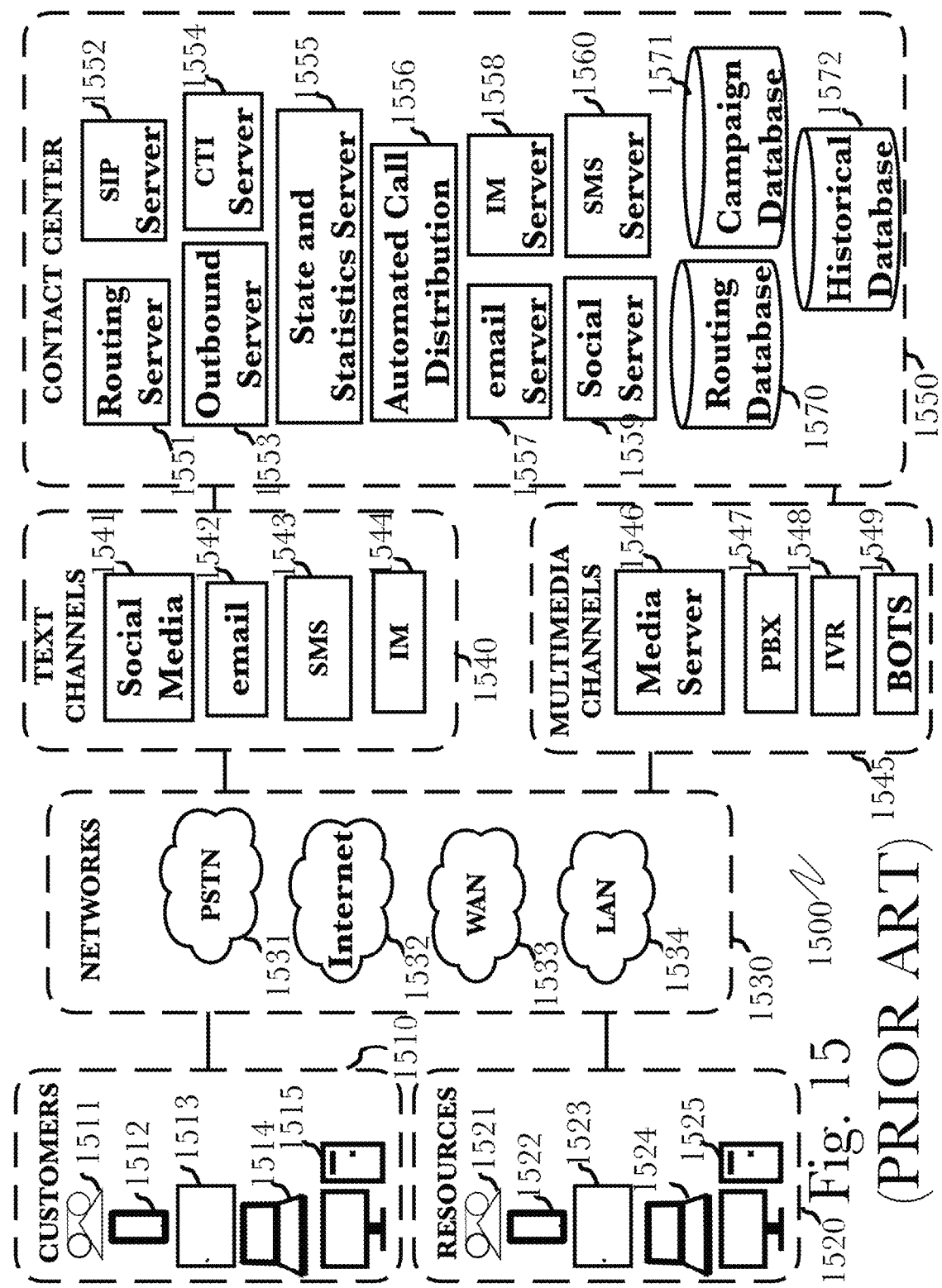
FIG. 15 (PRIOR ART) is a typical system architecture diagram of a contact center including: components commonly known in the art.

FIG. 15 (PRIOR ART) is a typical system architecture diagram of a contact center 1500, known to the art. A contact center is similar to a call center, but a contact center has more features. While a call center only communicates by voice, a contact center adds email, text chat such as but not limited to instant messaging, social media posts and SMS interaction, and web interfaces to voice communication in order to facilitate communications between a customer endpoint 1510, and a resource endpoint 1520, through a network 1530, by way of at least one interface, such as a text channel 1540 or a multimedia channel 1545 which communicates with a plurality of contact center components 1550. A contact center 1500 is often operated through an extensive open workspace for agents with work stations that may include a desktop computer 1525 or laptop 1524 for each resource 1520, along with a telephone 1521 connected to a telecom switch, a mobile smartphone 1522, and/or a tablet 1523. A contact center enterprise may be independently operated or networked with additional centers, often linked to a corporate computer network 1530. Resources are often referred to as agents, but for inside sales, for example, they may be referred to as sales representatives, or in other cases they may be referred to as service representatives, or collection agents, etc. Resource devices 1520 may communicate in a plurality of ways, and need not be limited to a sole communication process. Resource devices 1520 may be remote or in-house in a contact center; or out-sourced to a third party, or working from home. They handle communications with customers 1510 on behalf of an enterprise. Resource devices 1520 may communicate by use of any known form of communication known in the art be it by a telephone 1521, a mobile smartphone 1522, a tablet 1523, a laptop 1524, or a desktop computer 1525, to name a few examples. Similarly, customers 1510 may communicate in a plurality of ways, and need not be limited to a sole communication process. Customer devices 1510 may communicate by use of any known form of communication known in the art, be it by a telephone 1511, a mobile smartphone 1512, a tablet 1513, a laptop 1514, or a desktop computer 1515, to name a few examples. Communications by telephone may transpire across different network types, such as public switched telephone networks, PSTN 1531, or via an internet network 1532 for Voice over Internet Protocol (VoIP) telephony. Similarly, VoIP or web-enabled calls may utilize a Wide Area Network (WAN) 1533 or a Large Area Network 1534 to terminate on a media server 1546. Network types we provided by way of example, only, and should not be assumed to be the only types of networks used for communications. Further, resource devices 1520 and customer devices 1510 may communicate with each other and with backend services via networks 1530. For example, a customer calling on telephone handset 1511 may connect through PSTN 1531 and terminate on a private branch exchange, PBX 1547, which is a type of multimedia channel 1545. A video call originating from a tablet 1523 may connect through an internet connection 1532 and terminate on a media server 1546. A customer device such as a smartphone 1512 may connect via a WAN 1533, and terminate on an interactive voice response unit, IVR 1548, such as in the case of a customer calling a customer support line for a hank or a utility service. Text channels 1540, may comprise social media 1541, email 1542, SMS 1.543 or as another form of text chat, IM 1544, and would communicate with their counterparts, each respectively being social server 1559, email server 1557, SMS server 1560, and IM server 1558. Multimedia channels 1545 may comprise at least one media server 1546, PBX 1547, IVR 1548, and/or BOTS 1549. Text channels 1540 and multimedia channels 1545 may act as third parties to engage with outside social media services and so a social server 1559 inside the contact center will be required to interact with the third party social media 1541. In another example, an email server 1557 world be owned by the contact center 1500 and would be used to communicate with a third party email channel 1542. The multimedia channels 1545, such as media server 1546, PBX 1547, IVR 1548, and BOTS 1549, are typically present in an enterprise's datacenter, but could be hosted in a remote facility or in a cloud facility or in a multifunction service facility. The number of communication possibilities are vast between the number of possible resource devices 1520, customer devices 1510, networks 1530, channels 1540/ 1545, and contact center components 1550, hence the system diagram on FIG. 15 indicates connections between delineated groups rather than individual connections for clarity.

Continuing on FIG. 15 (PRIOR ART), shown to the right of text channels 1540, and multimedia channels 1545, are a series of contact center components 1550, including servers, databases, and other key modules that may be present in a typical contact center, and may work in a black box environment, and may be used collectively in one location or may be spread over a plurality of locations, or even be cloud-based, and more than one of each component shown may be present in a single location or may be cloud-based or may be in a plurality of locations or premises. Contact center components 1550, may comprise a routing server 1551, a SIP server 1552, an outbound server 1553, a computer telephony integration server CTI 1554, a state and statistics server (also known and referred to herein as a STAT server) 1555, an automated call distribution facility, ACD 1556, an email server 1557, air IM server 1558, a social server 1559, a SMS server 1560, a routing database 1570, a historical database 1572, and a campaign database 1571. It is possible that other servers and databases may exist within a contact center, but in this example, the referenced components are used. Continuing with the example given above, in some conditions where a single medium (such as ordinary telephone calls) is used for interactions that require routing, media server 1546 may be more specifically a private branch exchange (PBX) 1547, automated call distributor (ACD) 1556, or similar media-specific switching system. Generally, when interactions arrive at media server 1546, a route request, or a variation of a route request (for example, a SIP invite message), is sent to session initiation protocol SIP server 1552, or to an equivalent system such as a computer telephony integration (CTI) server 1554. A route request is a data message sent from a media-handling device such as media server 1546 to a signaling system such as SIP server 1552, the message comprising a request for one or more target destinations to which to send (or route, or deliver) the specific interaction with regard to which the route request was sent. SIP server 1552 or its equivalent may, in some cases, carry out any required routing logic itself, or it may forward the route request message to routing server 1551. Routing server 1551 executes, using statistical data from state and statistics server (STAT server) 1555 and (at least optionally) data from routing database 1570, a routing script in response to the route request message and sends a response to media server 1546 directing it to route the interaction to a specific target resource 1520. In another case, routing server 1551 uses historical information from a historical database 1572, or real time information from campaign database 1571, or both, as well as configuration information (generally available from a distributed configuration system, not shown for convenience) and information from routing database 1570. STAT server 1554 receives event notifications from media server 1546 or SIP server 1552 (or both) regarding events pertaining to a plurality of specific interactions handled by media server 1546 or SIP server 1552 (or both), and STAT server 1555 computes one or more statistics for use in routing based on the received event notifications. Routing database 1570 may of course be comprised of multiple distinct databases, either stored in one database management system or in separate database management systems. Examples of data that may normally be found in routing database 1570 may include (but are not limited to): customer relationship management CRM) data; data pertaining to one or more social networks (including, bin not limited to network graphs capturing social relationships within relevant social networks, or media updates made by members of relevant social networks); skills data pertaining to a plurality of resources 1520 (which may be human agents, automated software agents, interactive voice response scripts, and so forth); data extracted from third party data sources including cloud-based data sources such as CRM and other data from SALESFORCE.COM™, credit data from EXPERIAN™, consumer data from DATA.COM™; or any other data that may be useful in making routing decisions. It will be appreciated by one having ordinary skill in the art that there are many means of data integration known in the art, any of which may be used to obtain data from premise-based, single machine-based, cloud-based, public or private data, sources as needed, without departing from the scope of the invention. Using information obtained from one or more of STAT server 1555, routing database 1570, campaign database 1572, historical database 1571, and any associated configuration systems, routing server 1551 selects a routing target from among a plurality of available resource devices 1520, and routing server 1551 then instructs SIP server 1552 to route the interaction in question to the selected resource device 1520, and SIP server 1552 in turn directs media server 1546 to establish an appropriate connection between customer devices 1510 and target resource device 1520. In this case, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that customer devices 1510 are generally, but not necessarily, associated with human customers or users. Nevertheless, it should be understood that routing of other work or interaction types is possible, although in any case, is limited to act or change without input from a management team.

Figure 16:
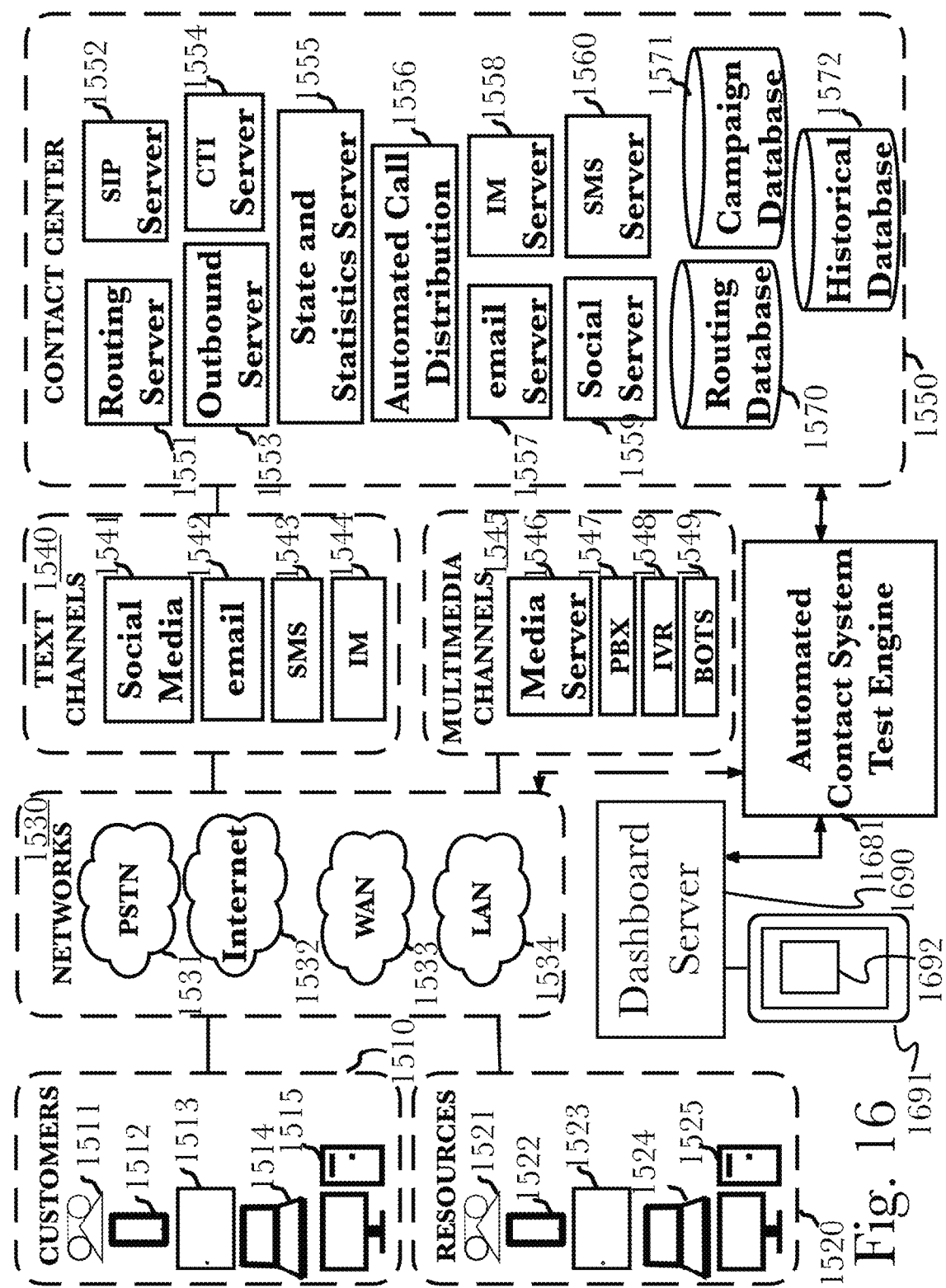
FIG. 16 is a block diagram illustrating an exemplary system architecture for an automated contact center test engine with a mobile dashboard app, according to a preferred embodiment of the invention.

FIG. 16 is a block diagram illustrating an exemplary system architecture 1600 for an automated contact center test system comprising a mobile dashboard application 1692 operable on a mobile device 1691 comprising at least a processor to operate mobile dashboard application 1692 and a memory to store mobile dashboard application 1692 and a dashboard server 1690, according to a preferred embodiment of the invention. According to the embodiment, system 1600 may comprise an automated end-to-end contact center testing system 1681 operating on at least one network 1530, 1687 as illustrated. A plurality of customers 1510 and network-connected resources 1520 may connect to a contact center 1550 via a network 1530 using a variety of specific communication means such as including (but not limited to) text-based communication channels 1540 such as social media networks 1541, email messages 1542, SMS messaging 1543 or IP-based instant messaging 1544, or via multimedia communication channels 1545 such as via a media server 1546, a private branch exchange (PBX) 1547, an interactive voice response (J R) system 1548, or via communication hots 1549 that may automate or simulate communication (as may be used for testing purposes without relying on actual customer communication). Communication may occur over a variety of network types 1530, such as (again, including but not limited to) a public switched telephone network (PSTN) 1531, the Internet 1532 or other wide-area network (WAN) 1533, or a local-area network (LAN) 1534, according to various arrangements. For example, internal testing may occur exclusively within a LAN, while testing of online helpdesk interactions may use Internet-connected IM or email, or other arrangements.

A contact center may comprise a number of systems and features common in the art, such as for example a routing server 1551 that directs other components based on routing instructions horn a routing database 1570 to route interactions to appropriate handling endpoints (such as agents to answer calls or IMs), a session initiation protocol (SIP) server 1552 that handles SIP-based telephony, an outbound server 1553 that processes outbound interaction attempts such as customer callbacks, state and statistics server 1555 that manages internal contact center state monitoring and statistics (for example, tracking interaction metrics such as handle time, queue wait time, number of interactions handled or transferred, and other various metrics that we commonly tracked in contact center operations), or an automated call distributor (ACD) that may be used to automatically distribute interactions to endpoints, (for example based on customer input or agent skills). Additionally, a variety of interaction servers may be used to appropriately receive, process, and handle interactions such as a computer-telephony integration (CTI) server 1554 that may be used to connect telephony and computer-based or IP technologies, email server 1557 that troy be used to handle entail-based interactions, instant messaging (IM) server 1558 that may be used to handle web-based instant messaging, social server 1559 that may be used to handle content from social media networks (such as communicating directly with a social network's public API, for example to read and process content and user messages), or short message service (SMS) server 1560 that may be used to handle SMS-based text messages. Additionally, contact center campaign information (for example, metric goals pertaining to a particular customer or campaign) may be stored in a campaign database 1571 for reference, and historical interaction information may be stored in an historical database 1572 such as to store call recording for later reference or analysis. According to an aspect, dashboard server 1690 may be configured by properly authorized users, the configuration determining what information is available, in what form, for use in mobile dashboard applications 1692 operating on mobile devices 1691; once configured, dashboard server 1690 receives data in real time from the various other components of test system 1600, and in particular automated contact center test engine 1681, and transmits the data, optionally aggregated and/or analyzed, to a plurality of mobile devices 1690 via a wireless network, for display on a plurality of mobile dashboard applications 1692.

FIG. 29 is a flow diagram of an exemplary method for a mobile dashboard device operating a mobile dashboard for automated contact center testing, according to an aspect. The mobile dashboard device by receives real-time update data from the notification huh in step 2901. The mobile dashboard device generates history data from the real-time update data in step 2902. Step 2903 receives mobile dashboard display commands from the user. These commands are user interface commands used to select what dashboard data is to be reviewed. Step 2904 determines what, if any, dashboard data needed, to generate a requested dashboard screen based upon the real-time update data and a dashboard input command.

Step 2905 retrieves all of the needed dashboard data from the dashboard server in order to render a dashboard screen on the mobile dashboard device. Once rendered, the dashboard screen is output to the user of the mobile dashboard de ice 2906. Receipt of additional mobile dashboard display commands and/or additional real-time update data generates a new display update process. The dashboard server, the notification hub, the messaging server, and the one or more mobile dashboard devices communicate over a wide area network.

Hardware Architecture

Generally, the techniques disclosed herein may, be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or ally combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
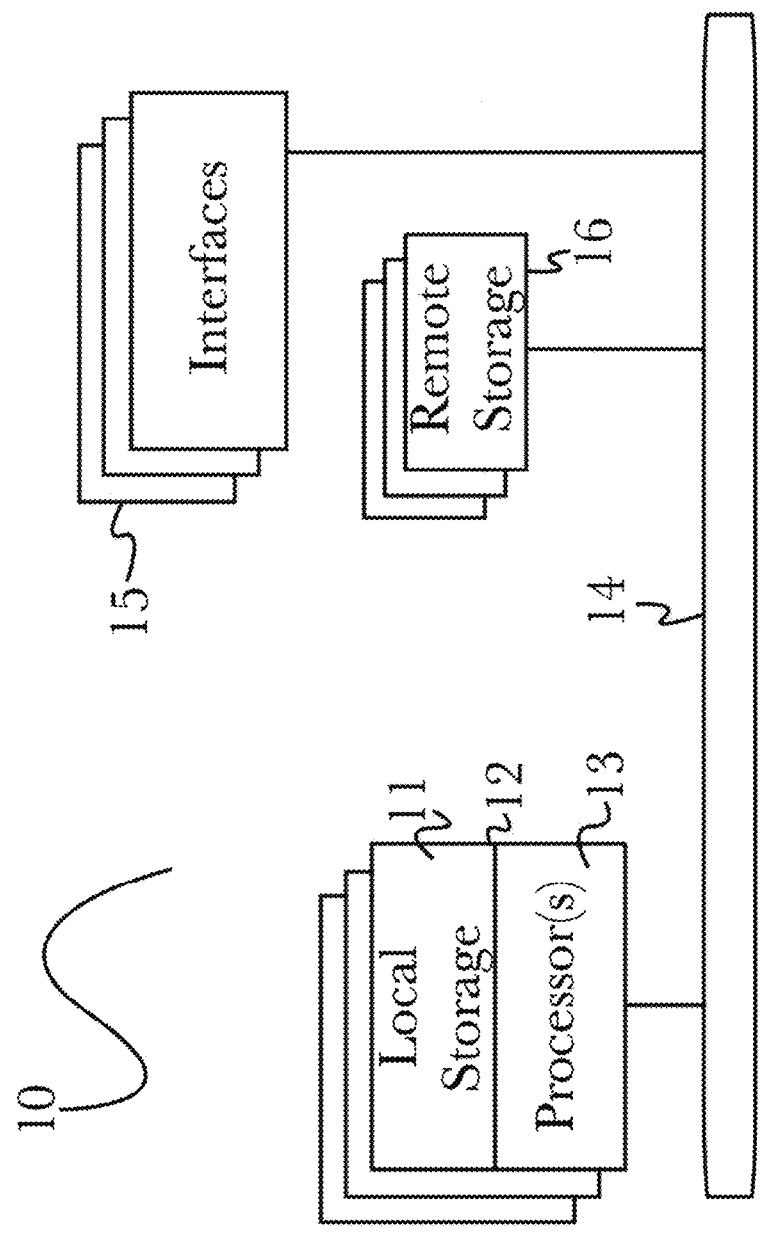
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area, network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term processor is not limited merely to those integrated circuits referred to in the art as a processor, a mobile processor, or a microprocessor, but broadly refers to microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interlaces may be provided such as, for example, universal serial bus (USE), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (BATA) or external SATA (ESATA) interfaces, high-definition multimedia interface (HDMI), digital visual interface (DVI), analog or digital audio interlaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state chives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
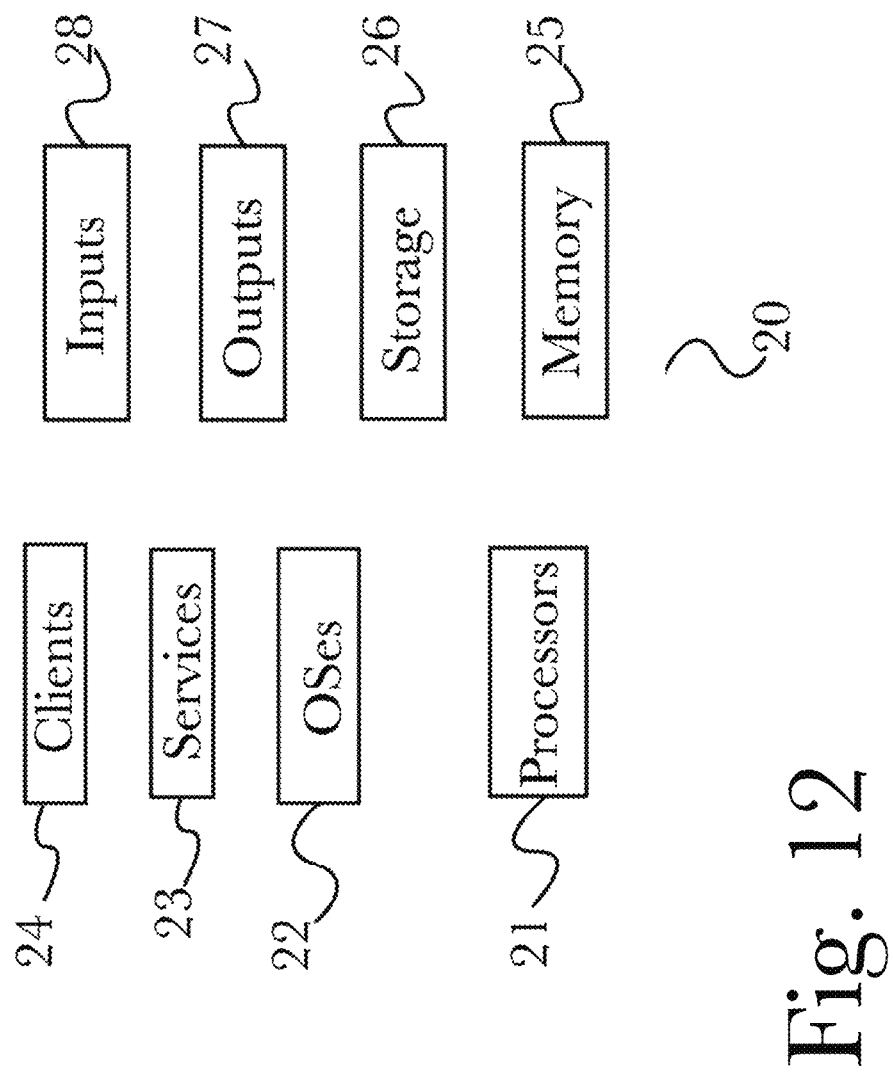
FIG. 12 is a block diagram illustrating an exemplary logical architecture for a client device.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
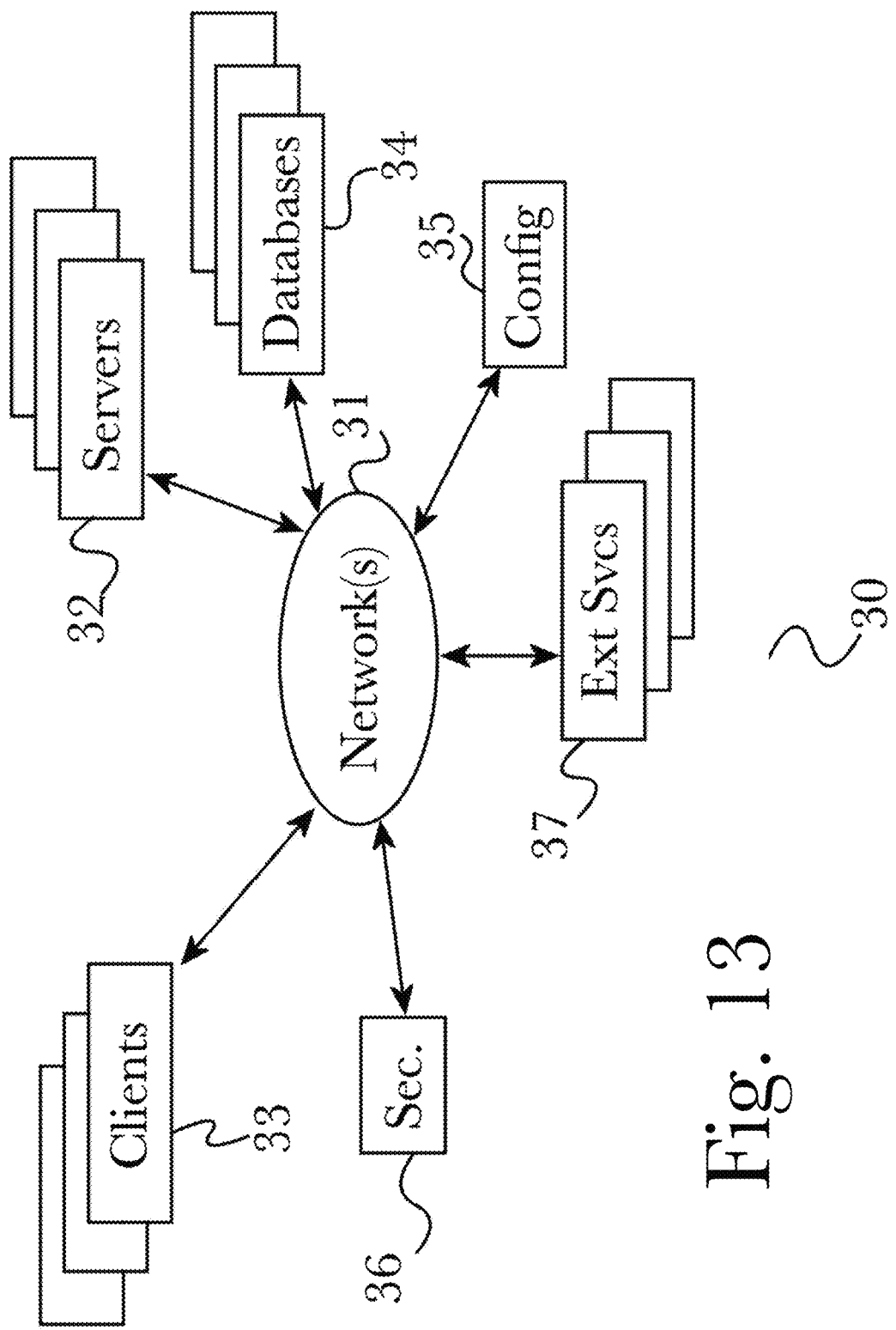
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiMAX, LEE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) mar make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or senility subsystems known in the art now or in the future may be used in conjunction with aspects without limitation, unless a specific security 36 or configuration system 35 or approach is specifically required by the description of any specific aspect.

Figure 14:
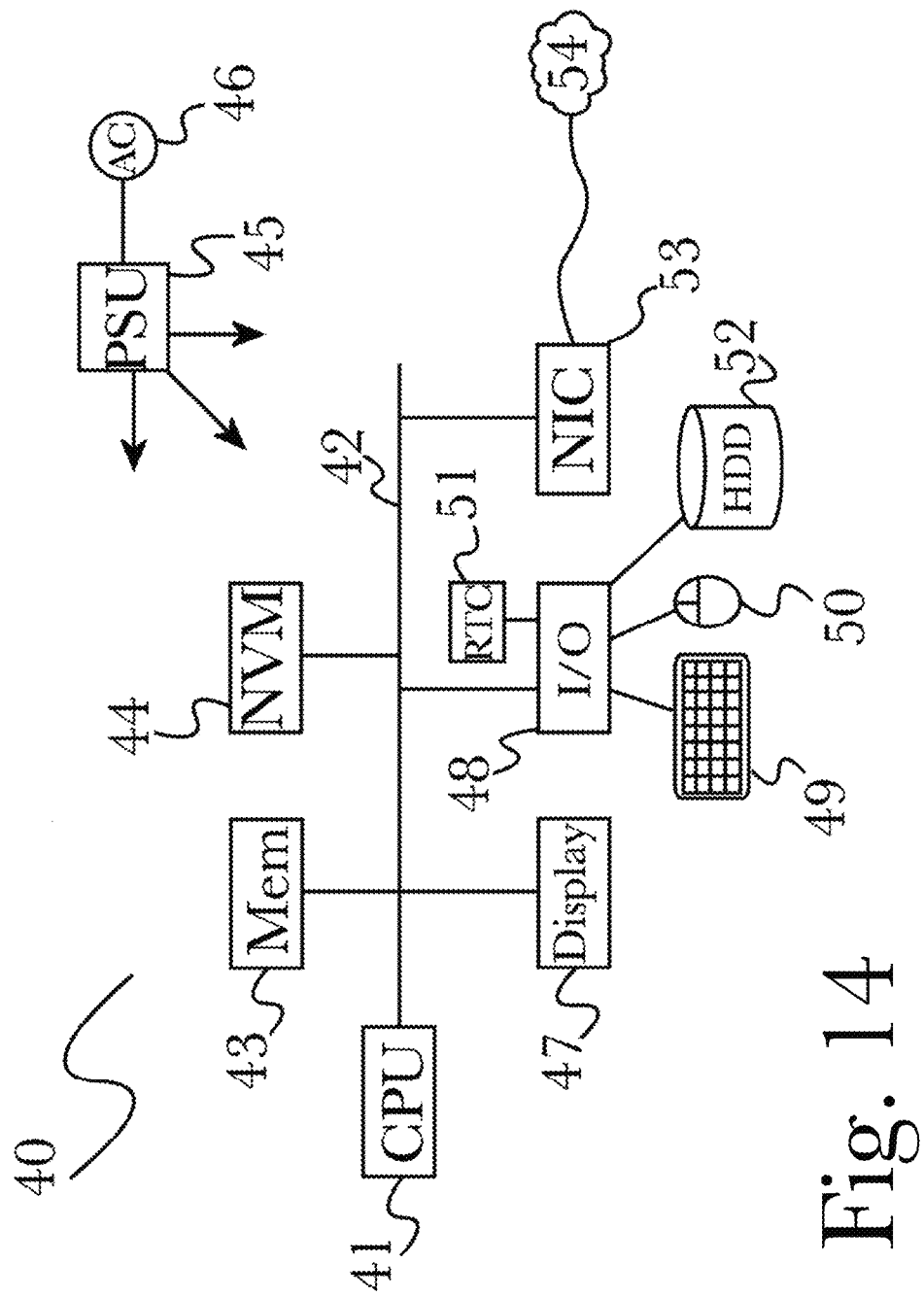
FIG. 14 is another block diagram illustrating an exemplary hardware architecture of a computing device.

FIG. 14 shows an exemplary overview of a computer system 40 as may be used in any of the various locations throughout the system. Itis exemplary of any computer that may execute code to process data. Various modifications and changes may be made to computer system 40 without departing horn the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. MC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that, could be present, and many other devices and modifications that, are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of Client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for a mobile dashboard for automated contact center testing comprising:
    a dashboard server comprising at least a processor, a memory, and a plurality of programming instructions stored in the memory and operating on the processor, wherein the programmable instructions, when operating on the processor, cause the processor to:
    receive real-time update data;
    generate history data from the real-time update data;
    receive mobile dashboard display commands;
    determine dashboard data needed for display based upon the real-time update data;
    retrieve needed dashboard data;
    operate a mobile dashboard application accessible via a network, wherein the mobile dashboard application provides visual indicia to display at least one of either the real-time update data or the history data; and
    present at least a portion of the dashboard data for viewing, by the mobile device, via the mobile dashboard application.

2. The system according to claim 1, wherein the mobile dashboard application comprises: an incident screen, an incident details screen, an interaction details screen, an incident screenshot screen, a journeys summary screen, a journeys details screen, a summary screen, and operational health screen.

3. The system according to claim 2, wherein the dashboard data comprises status data for a plurality of communications channels and results data, the plurality of communications channels comprises a web channel, and SMS channel, a voice channel and an email channel.

4. The system according to claim 3, wherein the status data further comprises media data recordings of communications over one of the plurality of communications channels.

5. A method for operating a mobile dashboard for automated contact center testing, comprising the steps of:
    receiving real-time update data;
    generating history data from the real-time update data;
    receiving mobile dashboard display commands;
    determining dashboard data needed for display based upon the real-time update data;
    retrieving needed dashboard data;
    operating a mobile dashboard application accessible via a network, wherein the mobile dashboard application provides visual indicia to display at least one of either the real-time update data or the history data; and
    presenting at least a portion of the dashboard data for viewing, by the mobile device, via the mobile dashboard application.

6. The system according to claim 5, wherein the mobile dashboard application comprises: an incident screen, an incident details screen, an interaction details screen, an incident screenshot screen, a journeys summary screen, a journeys details screen, a summary screen, and operational health screen.

7. The system according to claim 6, wherein the dashboard data comprises status data for a plurality of communications channels and results data, the plurality of communications channels comprises a web channel, and SMS channel, a voice channel and an email channel.

8. The system according to claim 7, wherein the status data further comprises media data recordings of communications over one of the plurality of communications channels.

* * * * *